US012147593B2

(12) United States Patent
Wang et al.

(10) Patent No.: US 12,147,593 B2
(45) Date of Patent: Nov. 19, 2024

(54) MODULAR OMNIDIRECTIONAL MOTION PLATFORM

(71) Applicant: Beijing Yunchuang Qihang Intelligent Technology Co., Ltd, Beijing (CN)

(72) Inventors: Ziyao Wang, Jiangsu (CN); Haikun Wei, Jiangsu (CN); Kanjian Zhang, Jiangsu (CN)

(73) Assignee: Beijing Yunchuang Qihang Intelligent Technology Co., Ltd, Beijing (CN)

( * ) Notice: Subject to any disclaimer, the term of this patent is extended or adjusted under 35 U.S.C. 154(b) by 0 days.

(21) Appl. No.: 18/757,545

(22) Filed: Jun. 28, 2024

(65) Prior Publication Data
US 2024/0345655 A1  Oct. 17, 2024

Related U.S. Application Data

(63) Continuation of application No. PCT/CN2023/082694, filed on Mar. 21, 2023.

(30) Foreign Application Priority Data

Feb. 18, 2022 (CN) .......................... 202210149746.3

(51) Int. Cl.
G06F 3/01 (2006.01)
A63B 22/02 (2006.01)
A63B 71/00 (2006.01)

(52) U.S. Cl.
CPC .......... *G06F 3/011* (2013.01); *A63B 22/0235* (2013.01); *A63B 71/0054* (2013.01);
(Continued)

(58) Field of Classification Search
CPC ............... G06F 3/011; G06F 2203/012; A63B 22/0235; A63B 71/0054; A63B 2022/0271; A63B 2071/009
(Continued)

(56) References Cited

U.S. PATENT DOCUMENTS

2003/0221932 A1\* 12/2003 Costanzo ............... B65G 47/24
                                                           198/782
2013/0087430 A1\* 4/2013 Kirk ....................... B65G 15/52
                                                           198/779
(Continued)

FOREIGN PATENT DOCUMENTS

CN      105126299       12/2015
CN      105617605       6/2016
(Continued)

OTHER PUBLICATIONS

"International Search Report (Form PCT/ISA/210) of PCT/CN2023/082694", mailed on Jun. 27, 2023, with English translation thereof, pp. 1-6.
(Continued)

Primary Examiner — Kerri L McNally
(74) Attorney, Agent, or Firm — JCIPRNET

(57) ABSTRACT

A modular omnidirectional motion platform includes left-rotating speed decomposition units and right-rotating speed decomposition units. Rotational speed of each left-rotating speed decomposition unit is the same. Rotational speed of each right-rotating speed decomposition unit is the same. The left-rotating and right-rotating speed decomposition units are alternately and parallelly arranged. The left-rotating speed decomposition units have different lengths. The right-rotating speed decomposition units have different
(Continued)

lengths. Each speed decomposition unit comprises a load-bearing shaft and rotating shafts fixed around the load-bearing shaft. Parallel transmission assemblies are disposed on the load-bearing shafts. Two adjacent left-rotating speed decomposition units are connected by one parallel transmission assembly, and two adjacent right-rotating speed decomposition units are connected by one parallel transmission assembly. The left-rotating speed decomposition units rotate together at a same speed in a same direction. The right-rotating speed decomposition units rotate together at a same speed in a same direction.

12 Claims, 17 Drawing Sheets

(52) U.S. Cl.
CPC . *A63B 2022/0271* (2013.01); *A63B 2071/009* (2013.01); *G06F 2203/012* (2013.01)
(58) Field of Classification Search
USPC ........................................ 340/407.1
See application file for complete search history.

(56) References Cited

U.S. PATENT DOCUMENTS

| | | | |
|---|---|---|---|
| 2014/0111424 | A1 | 4/2014 | Goetgeluk |
| 2018/0147442 | A1* | 5/2018 | Moon ............... A63B 22/0285 |
| 2021/0113904 | A1* | 4/2021 | Zhao ............... A63B 69/0035 |
| 2021/0245025 | A1* | 8/2021 | Wang ............... A63B 69/0035 |

FOREIGN PATENT DOCUMENTS

| | | |
|---|---|---|
| CN | 108283793 | 7/2018 |
| CN | 109126024 | 1/2019 |
| CN | 210543243 | 5/2020 |
| CN | 114522395 | 5/2022 |
| SE | 1300744 | 6/2015 |
| WO | 2020106369 | 5/2020 |

OTHER PUBLICATIONS

"Written Opinion of the International Searching Authority (Form PCT/ISA/237) of PCT/CN2023/082694", mailed on Jun. 27, 2023, pp. 1-4.

* cited by examiner

MODULAR OMNIDIRECTIONAL MOTION PLATFORM

CROSS-REFERENCE TO RELATED APPLICATION

This application is a continuation of international application of PCT application serial no. PCT/CN2023/082694 filed on Mar. 21, 2023, which claims the priority benefit of China application no. 202210149746.3 filed on Feb. 18, 2022. The entirety of each of the above-mentioned patent applications is hereby incorporated by reference herein and made a part of this specification.

BACKGROUND

Technical Field

The present invention belongs to the technical field of omnidirectional motion of human body, and particularly relates to a modular omnidirectional motion platform.

Description of Related Art

By simulating various human sensory signals, such as vision, hearing, touch, and motion through a computer, virtual reality (VR) technology can provide virtual experiences that are indistinguishable from reality. Natural motion interaction technology is one of the important technologies in virtual reality, enabling users to explore spaces in a virtual world. Omnidirectional motion equipment based on the VR technology is a device capable of meeting demands of the users for omnidirectional motion, allowing the users to achieve unlimited walking, actions such as running, rotating, jumping, crouching, and dodging left and right, in a limited space in the VR.

In order to achieve the omnidirectional motion, there are some existing solutions, for example, a patent titled Lightweight VR Omnidirectional Motion Machine (CN201920999658.6) discloses a lightweight VR omnidirectional motion machine, featuring lightweight with a circular outline, and occupying a small area on the whole. However, the patent adopts a passive solution to solve the problem of omnidirectional motion for the users, the users actually perform in-place sliding during the monition, and need to spare great efforts to overcome friction. In addition, the patent omits complex waist movements, resulting in a certain degree of restraint in actual VR experience and relatively single types of motion, further, it is extremely unnatural for walking backwards, thereby affecting the immersive experience.

For another example, a patent titled Roller-type Omnidirectional Physical Exercise Platform and Speed Synthesis Method for Same (US20210245025A1) provides an active omnidirectional physical exercise platform capable of sending a user back to a center in any direction. However, the transmission design in the solution is only applicable to regular straight lines, leading to an overall square structure that wastes the area on polygonal lines, and making the platform difficult to miniaturize. In addition, the sequential single driving system therein results in greater wear near the driving end. The built-in motor design limits compatibility with other motors in different types and sizes, resulting in poor maintainability and scalability. The relatively rotating spiral shaft easily causes the feet of the user to get stuck inside the machine. Furthermore, a single platform cannot guarantee the safety of the user who loses the balance, featuring a poor safety on the whole.

The solutions in the prior art can roughly provide relatively natural motion experiences for the users, however, these solutions waste lots of space. Moreover, in order to balance the safety and comfort, these solutions have to ignore the freedom or completely release constraint on the users, failing to provide effective protection, making them difficult to achieve an effective balance between the safety and comfort. In addition, these solutions feature tightly coupled functional units, making rapid replacement and expansion of the functional units impossible, resulting in difficult overall maintenance and having poor scalability.

SUMMARY

In order to overcome the defects in the prior art, the present invention provide a modular omnidirectional motion platform and a safety protection device thereof, which has the advantages such as being small in occupied area, smooth in user movement experience, sufficient in safety and comfort, easy to maintain, and high in expandability.

In order to achieve the above objective, the present invention provides a modular omnidirectional motion platform, including a driving type omnidirectional motion chassis, and a driving unit and a protection support mounted on the driving type omnidirectional motion chassis. The driving type omnidirectional motion chassis includes a chassis bottom plate, and a plurality of longitudinal elongated speed decomposition units are mounted on the chassis bottom plate. The speed decomposition units include left-rotating speed decomposition units and right-rotating speed decomposition units. A rotational speed of each of the left-rotating speed decomposition units is the same. A rotational speed of each of the right-rotating speed decomposition units is the same. All the left-rotating speed decomposition units and the right-rotating speed decomposition units are alternately arranged in a parallel manner. The left-rotating speed decomposition units have different lengths, and the right-rotating speed decomposition units have different lengths. Each of the speed decomposition units includes a load-bearing shaft and rotating shafts fixed around the load-bearing shaft. Parallel transmission assemblies are disposed on the load-bearing shafts of the speed decomposition units, adjacent two of the left-rotating speed decomposition units are connected by one parallel transmission assembly, and adjacent two of the right-rotating speed decomposition units are connected by one parallel transmission assembly. At least one of the left-rotating speed decomposition units serves as an active left-rotating speed decomposition unit, and the active left-rotating speed decomposition unit rotates and transmits through the parallel transmission assemblies, such that all the left-rotating speed decomposition units rotate together at a same speed in the same direction. At least one of the right-rotating speed decomposition units serves as an active right-rotating speed decomposition unit, and the active right-rotating speed decomposition unit rotates and transmits through the parallel transmission assemblies, such that all the right-rotating speed decomposition units rotate together at a same speed in a same direction.

Further, each of the speed decomposition units also includes shaft end supports and a shaft middle support; and a plurality of small wheels with axles thereof arranged along a spiral line are disposed on each of the rotating shafts. A rotational direction of spiral lines disposed on the rotating shafts of the left-rotating speed decomposition units is opposite to a rotational direction of spiral lines disposed on the rotating shafts of the right-rotating speed decomposition units.

Further, left rotating shafts of the left-rotating speed decomposition units are assembled with freely rotatable small wheels arranged in positive 45 degrees; and right rotating shafts of the right-rotating speed decomposition units are assembled with freely rotatable small wheels arranged in negative 45 degrees. The small wheels are respectively supported by axles.

Each rotating shaft has a through hole matching the load-bearing shaft in a central axis direction, and has small wheel mounting grooves and small axle mounting holes with arranged in positive 45 degrees or negative 45 degrees on a shaft body thereof. Each small axle mounting hole is an unidirectional restriction structure and the axle is able to only be inserted from a single direction.

The load-bearing shaft is fixed on the shaft end supports and the shaft middle support by bearings, and is further fixed on the chassis bottom plate by the shaft end supports and the shaft middle support.

The load-bearing shaft is divided into a transmission area and a load-bearing area. The transmission area is assembled with the parallel transmission assembly. The load-bearing area is assembled with the rotating shafts via the through holes.

Further, among all the speed decomposition units, the speed decomposition unit located at an outermost side has a minimum length, and a length of the speed decomposition unit is set to be gradually increased from outside to inside. The driving type omnidirectional motion chassis is a circular chassis or a regular octagonal chassis.

Further, each of the speed decomposition units is divided into a front end and a rear end in a longitudinal elongated direction; the parallel transmission assemblies disposed on the left-handed speed decomposition units are all located at the front end; the parallel transmission assemblies disposed on the right-rotating speed decomposition units are all located at the rear end.

Further, the driving unit includes a left-rotating driving motor and a right-rotating driving motor; the left-rotating drive motor is mounted beside an outermost left-rotating speed decomposition unit, and the outermost left-rotating speed decomposition unit serves as the active left-rotating speed decomposition unit; and the right-rotating drive motor is mounted beside an outermost right-rotating speed decomposition unit, and the outermost right-rotating speed decomposition unit serves as the active right-rotating speed decomposition unit.

The left-rotating driving motor sequentially drives all the left-rotating speed decomposition units from one side through the parallel transmission assemblies; and the right-rotating driving motor sequentially drives all the right-rotating speed decomposition units from a side through the parallel transmission assemblies.

Further, the driving unit includes a left-rotating driving motor and a right-rotating driving motor, and two driving couplings.

The two driving couplings are respectively assembled at an end of one of the left-rotating speed decomposition units and an end of one of the right-rotating speed decomposition units. The left-rotating speed decomposition unit and the right-rotating speed decomposition unit respectively assembled with the driving couplings are adjacent to both sides of a symmetrical central axis of the chassis bottom plate.

The left-rotating speed decomposition unit mounted with the driving coupling serves as the active left-rotating speed decomposition unit and rotates under the drive of the left-rotating driving motor, and starts from a middle to both sides at the same time, so as to sequentially drive all the left-rotating speed decomposition units to rotate; and the right-rotating speed decomposition unit mounted with the driving coupling serves as the active right-rotating speed decomposition unit and rotates under the drive of the right-rotating driving motor, and starts from a middle to both sides at the same time, so as to sequentially drive all the right-rotating speed decomposition units to rotate.

Further, the driving type omnidirectional motion chassis further includes a plurality of middle reinforcement support plates and a plurality of anti-pinch strips. Each of the middle reinforcement support plates has a plurality of anti-pinch strip mounting grooves for being respectively assembled and fixed with the anti-pinch strips.

Further, a top cover surface edge of the driving type omnidirectional motion chassis is assembled with a device expansion turntable, the device expansion turntable has an outer ring and an inner ring, and the inner ring and the outer ring is rotatable relative to each other.

The outer ring and the inner ring have a height difference, where a bottom portion of the outer ring is lower than a bottom portion of the inner ring, and a top portion of the inner ring is higher than a top portion of the outer ring.

A groove with a length is formed at the bottom portion of the outer ring.

A plurality of device expansion turntable fixing holes adapted to a top cover of the driving type omnidirectional motion chassis are formed at intervals on an outer side of the outer ring, and the outer ring is fixed to the top cover of the driving type omnidirectional motion chassis through the device expansion turntable fixing holes.

A plurality of device expansion fixing holes are formed at intervals on an inner side of the inner ring.

Further, the modular omnidirectional motion platform further includes a protection support, and the protection support includes a back-type lumbar support.

The back-type lumbar support is fixed to the device expansion turntable through a lumbar support bottom plate.

A plurality of vertical linear rails are assembled on the lumbar support bottom plate, and are reinforced by primary oblique reinforcing members and primary transverse reinforcing members; and one vertical sliding block is assembled on each of the vertical linear rails, and a first-level spring is assembled below the vertical sliding block.

A vertical sliding block is assembled with a longitudinal sliding-block fixing plate, the longitudinal sliding-block fixing plate is assembled with a longitudinal sliding block, and the opposite longitudinal sliding-block fixing plates of the vertical linear rails are reinforced by a secondary transverse reinforcing member.

A longitudinal linear rail passes through the longitudinal sliding block, and the longitudinal linear rail is connected to a transverse reinforcing plate at an end of a side of the longitudinal linear rail away from a center of the chassis bottom plate; the longitudinal linear rail is assembled with a transverse linear-rail fixing plate at an end of a side facing the center of the chassis bottom plate; and one second-level spring is respectively assembled between the longitudinal sliding block and the transverse reinforcing plate, and between the longitudinal sliding block and the transverse linear-rail fixing plate.

A transverse linear rail is assembled and fixed on the transverse linear-rail fixing plate; and a transverse sliding block is assembled on the transverse linear rail.

The transverse sliding block is slidable in a direction of the transverse linear rail and rotate in an axis direction of the transverse linear rail.

Three-level springs are respectively assembled on the transverse linear rails on both sides of the transverse sliding block.

The back-type lumbar support includes a belt turntable and a belt module fixed on a transverse sliding block, the belt turntable includes an inner ring and an outer ring. The transverse sliding block is assembled and fixed with the inner ring of the belt turntable, and the outer ring of the belt turntable is assembled and connected to the belt module; and the inner ring and the outer ring of the belt turntable is rotatable relative to each other.

Further, the transverse sliding block is assembled and connected to the belt turntable through a vertical buffer. The vertical buffer includes a vertical buffer rail, a vertical buffer sliding block, and a buffer spring. The vertical buffer rail is fixed on the transverse sliding block, the vertical buffer sliding block is slidable on the vertical buffer rail, and the vertical buffer sliding block is connected and fixed to the belt turntable.

Further, the driving type omnidirectional motion chassis is provided with a standard driving unit interface and a standard protection support interface, the driving unit is assembled through the standard driving unit interface, and the protection support is assembled through the standard protection support interface.

Beneficial effects of the present invention:
1. By means of a special transmission mode, the present invention achieves the effect of continuous transmission of the driving type omnidirectional platform along a curve, such that a non-square omnidirectional platform surface is constructed. Compared with the central square surface structure in the prior art, the utilization rate of the effective area is improved, and the occupied area of the device is reduced.
2. By a driving mode of driving from the middle to the two ends or driving from the two ends of a middle through the driving unit, and by arranging the left-rotating speed decomposition units and the right-rotating speed decomposition units alternately in a parallel manner, the present invention solves the problem in the prior art that a transmission structure experiences uneven stress, and abrasion caused by single-side stress is reduced.
3. By means of designing the protection support, the present invention achieves motion in a vertical direction, a longitudinal direction, and a transverse direction, and rotation in a heading direction, a pitching direction, and a rolling direction, such that complete decoupling of six degrees of freedom of human motion is achieved. Therefore, corresponding safety settings can be set for a specific degree of freedom, such that enough safety protection is provided while the degree of freedom of the user is not affected, thereby achieving an effective balance between comfort and safety.
4. By setting the device expansion turntable on the periphery of the omnidirectional platform, a universal expansion interface is provided, which provides a possibility for the integration of other types of devices, and solves the problem of poor scalability in the prior art.

DESCRIPTION OF THE EMBODIMENTS

Figure 1:
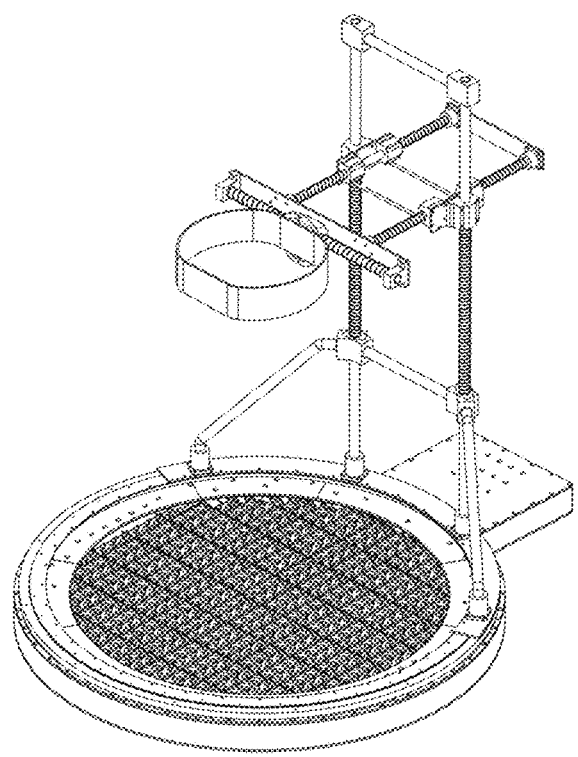
FIG. 1 is an overall schematic diagram of a complete assembly overview according to the present invention.
Figure 2:
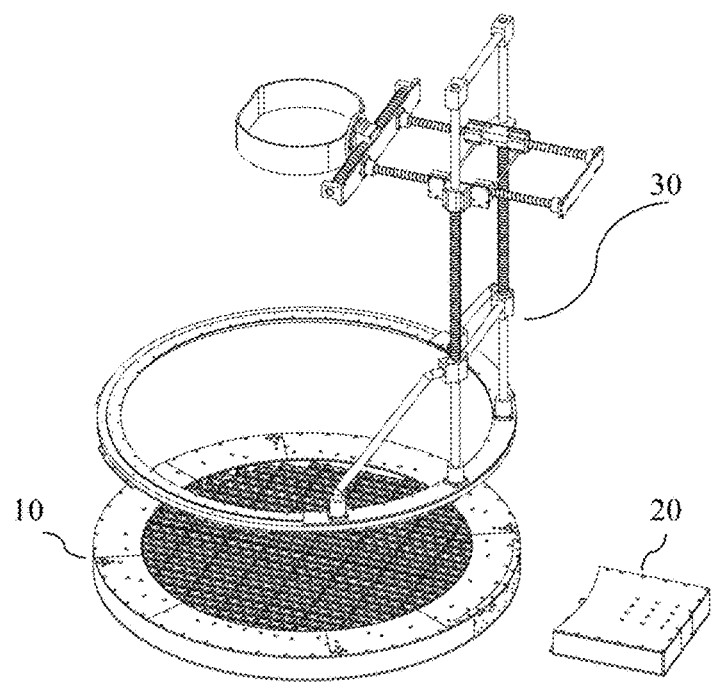
FIG. 2 is a schematic diagram of separation of modules of a driving type omnidirectional motion chassis, a driving unit and a protection support according to the present invention.
Figure 3:
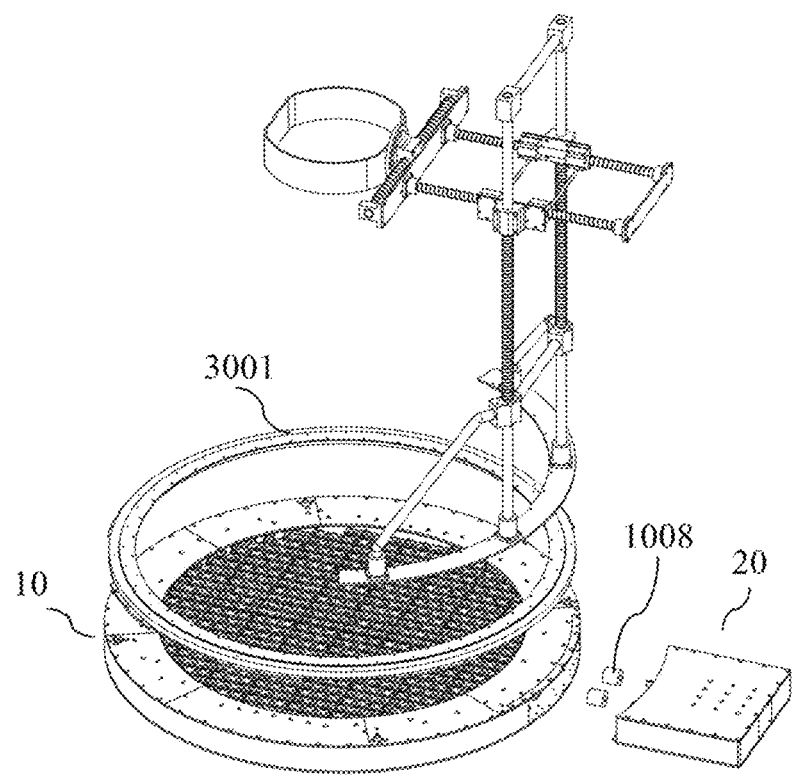
FIG. 3 is a schematic diagram of separation of a standard driving unit interface and a standard protection support interface from all modules according to the present invention.

The present invention provides a modular omnidirectional motion platform and a safety protection device thereof, and FIG. 1 illustrates a schematic diagram of complete assembly of this embodiment. A modular design solution involves decoupling and division of different functional units, as well as assembly and connection the different functions units through a certain standard interface, as shown in FIG. 2, this embodiment mainly includes a driving type omnidirectional motion chassis 10, a driving unit 20 and a protection support 30. FIG. 3 illustrates main components for assembling and connecting the different functional units, for example, the driving type omnidirectional motion chassis 10 is connected to and assembled with the driving unit 20 through driving couplings 1008, and the driving type omnidirectional motion chassis 10 is connected to and assembled with the protection support 30 through a device expansion turntable 3001.

FIG. 4 to FIG. 12 illustrate one specific embodiment of the driving type omnidirectional motion chassis 10.

Figure 4:
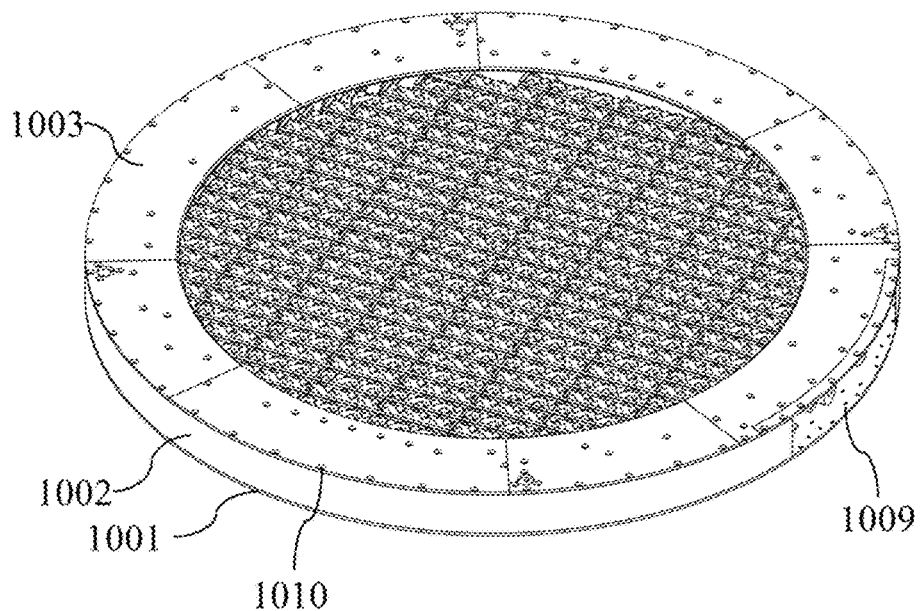
FIG. 4 is a schematic diagram of a driving type omnidirectional motion chassis from a first angle of view according to the present invention.
Figure 5:
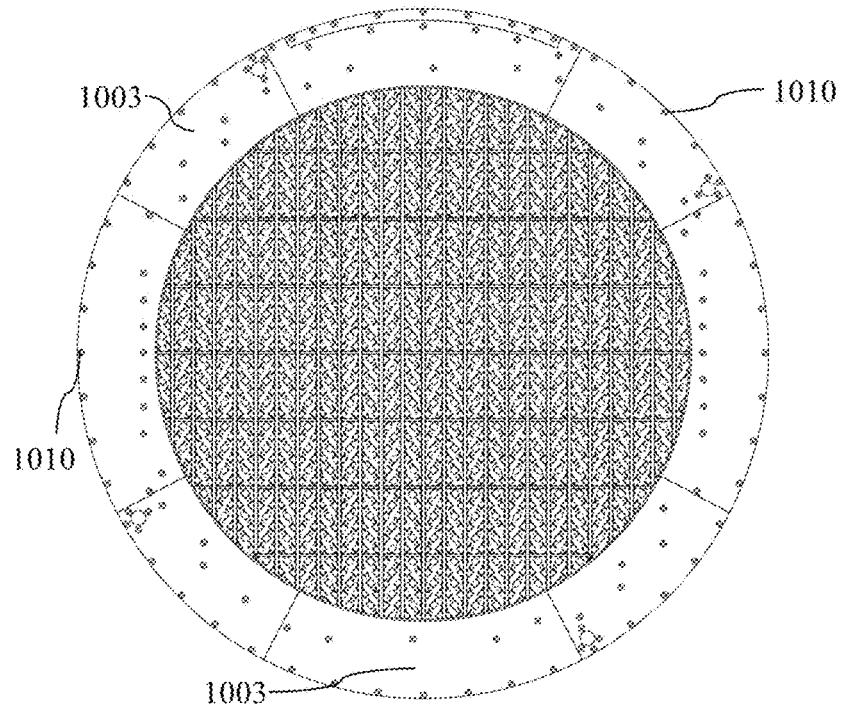
FIG. 5 is a top view of a driving type omnidirectional motion chassis according to the present invention.

As shown in FIG. 4 and FIG. 5, the driving type omnidirectional motion chassis 10 includes a chassis bottom plate 1001, a chassis side edge 1002, and a top chassis cover 1003. Driving unit connecting holes 1009 are formed on the chassis bottom plate 1001, and the driving unit connecting holes 1009 and the driving couplings 1008 (see FIG. 3) together constitute a standard driving unit interface in this embodiment. The top chassis cover 1003 is provided with device expansion turntable fixing holes 1010 for fixing the device expansion turntable 3001.

Figure 6:
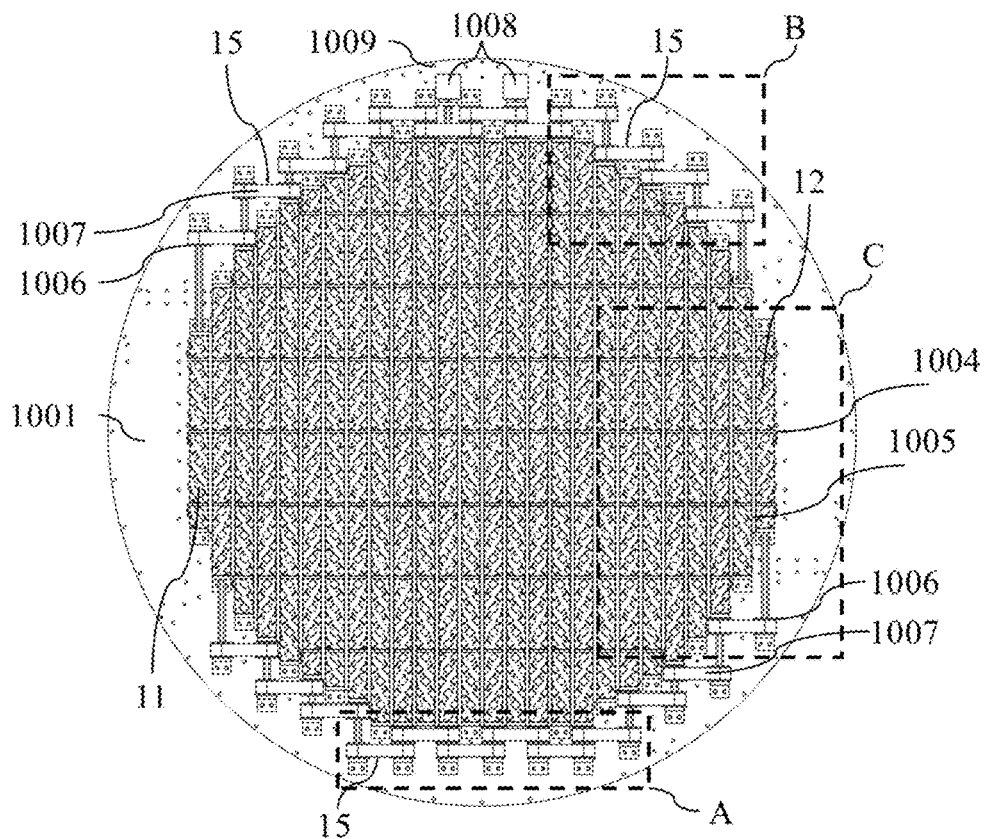
FIG. 6 is a top view of internal details of a driving type omnidirectional motion chassis, with a top cover removed, according to the present invention.
Figure 27:
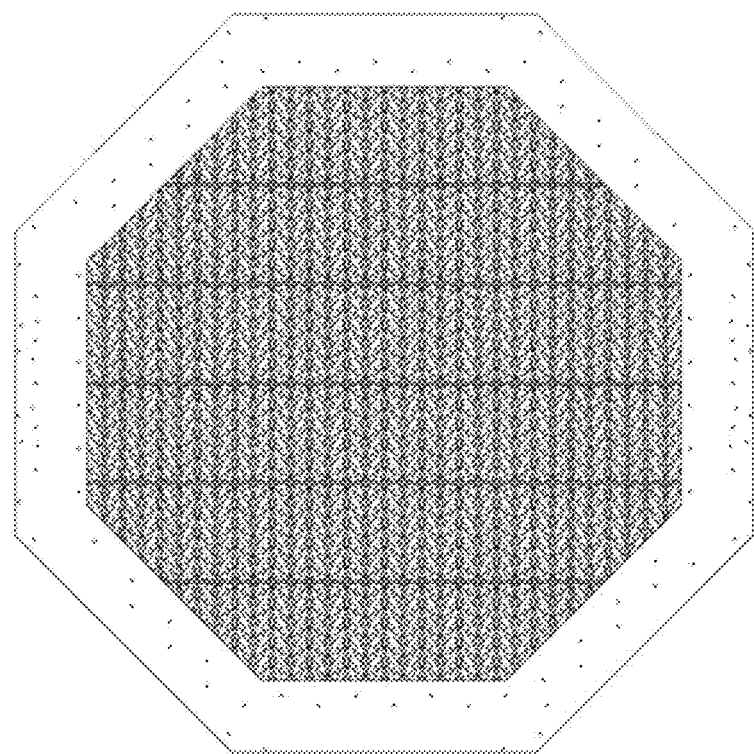
FIG. 27 is a schematic diagram that a regular octagonal driving type omnidirectional motion chassis is used according to the present invention.
Figure 28:
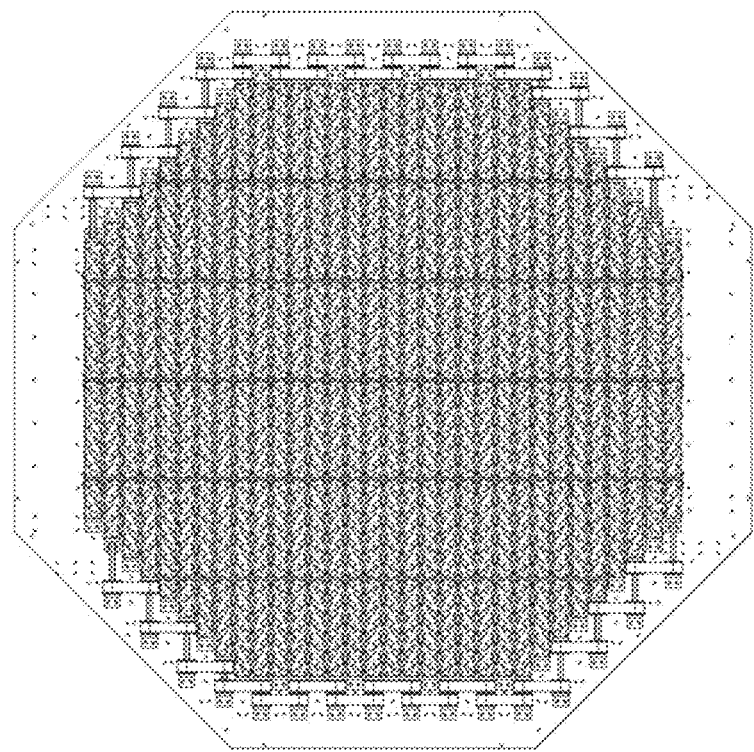
FIG. 28 is a schematic diagram of an arrangement of a speed decomposition unit inside a regular octagonal driving type omnidirectional motion chassis according to the present invention.

FIG. 6 illustrates internal details of the driving type omnidirectional motion chassis 10, further including middle reinforcement support plates 1004, anti-pinch strips 1005, left-rotating speed decomposition units 11, right-rotating speed decomposition units 12, and parallel transmission assemblies 15. The left-rotating speed decomposition units 11 and the right-rotating speed decomposition units 12 are densely and alternately mounted on the chassis bottom plate 1001 in a parallel manner. A rotational direction of spiral lines disposed on the rotating shafts of the left-rotating speed decomposition units 11 is opposite to a rotational direction of spiral lines disposed on the rotating shafts of the right-rotating speed decomposition units 12, so as to distinguish the left-rotating speed decomposition units 11 from the right-rotating speed decomposition units 12. Rotational speed of the left-rotating speed decomposition units 11 are the same, and rotational speed of all the right-rotating speed decomposition units 12 are the same. By adjusting lengths of the left-rotating speed decomposition units 11 and the right-rotating speed decomposition units 12, a surface constituting any shape boundary can be approximated. In this embodiment, a preferred solution is that the boundary shape of the driving type omnidirectional motion chassis 10 formed thereby is a circle as shown in FIG. 6, which eliminates a redundant area in a diagonal direction of the square surface, such that an overall occupied area of the platform is small, and in addition, a distinctive curved shape boundary according to the actual situation. Another preferred solution is that the boundary shape of the driving type omnidirectional motion chassis 10 is a regular octagon as shown in FIG. 27 and FIG. 28. FIG. 6 further illustrates assembly methods of the parallel transmission assemblies 15, including a staggered assembly method and a stacked assembly method, where the staggered assembly method involves an arrangement that two adjacent left-rotating speed decomposition units (or two right-rotating speed decomposition units) with the same length or a small change range are staggered, such that two adjacent parallel transmission assemblies 15 are approximately on the same straight line, the staggered assembly method is suitable for the curved boundary portions with the straight line or the small change range to minimize space occupation, as shown in Area A in FIG. 6. The stacked assembly method involves a method that lengths of the two adjacent left-rotating speed decomposition units (or the two right-rotating speed decomposition units) with a great change range are stacked, such that two adjacent parallel transmission assemblies 15 form a drop-type arrangement in an axis direction of the speed decomposition units, the stacked assembly method is suitable for the curved boundary portions with oblique lines or the great change range to adapt to continuous transmission under a curve contour, as shown in Area B in FIG. 6, and the two assembly methods can be used in combination, which is applied to continuous transmission under any curve shape boundary.

Figure 7:
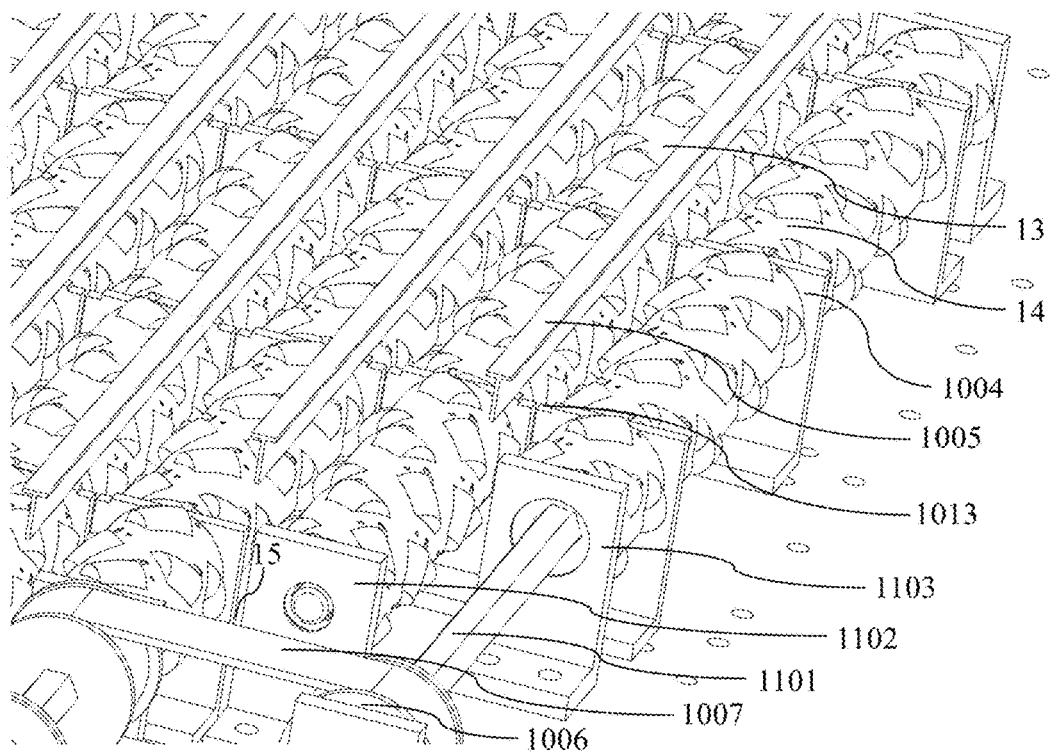
FIG. 7 is a structural schematic diagram of local details and an anti-pinch safety structure of a driving type omnidirectional motion chassis according to the present invention.

FIG. 7 illustrates local details of Area C in FIG. 6, and FIG. 8 to FIG. 12 illustrate details of a local structure of components in the corresponding area.

In FIG. 7, a plurality of the left-rotating speed decomposition units 11 and the right-handed speed decomposition units 12 are fixed on the chassis bottom plate 1001 through shaft end supports 1102 and shaft middle supports 1103. The adjacent speed decomposition units with the same type are connected and transmitted through the parallel transmission assemblies 15. A plurality of the middle reinforcement support plates 1004 provide a support effect for middle portions of the speed decomposition units. The anti-pinch strips 1005 are located above anti-pinch strip mounting grooves 1013 and are in a pre-assembly state.

A preferred solution of one parallel transmission assembly 15 is a transmission structure formed by synchronous wheels 1006 and synchronous belts 1007 as described in this embodiment, and further, each of the parallel transmission assemblies 15 can use a belt, a belt pulley, a chain, a sprocket combination, and the like, according to actual situation.

Figure 8:
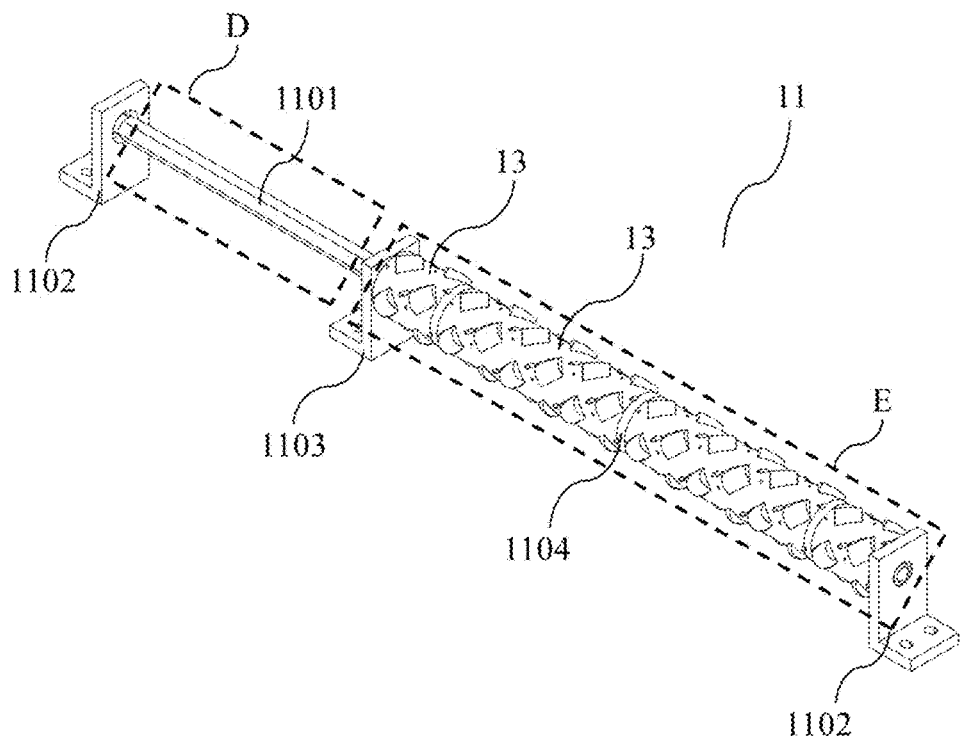
FIG. 8 is a schematic diagram of a left-rotating speed decomposition unit according to the present invention.
Figure 9:
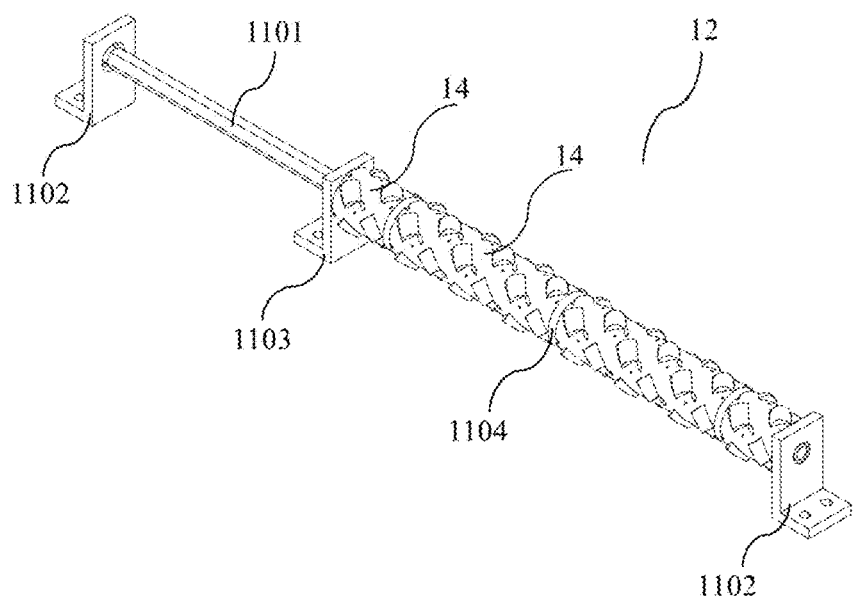
FIG. 9 is a schematic diagram of a right-rotating speed decomposition unit according to the present invention.

As shown in FIG. 8 and FIG. 9, structural details of a speed decomposition unit include a load-bearing shaft 1101, shaft end supports 1102, and a shaft middle support 1103. Each left-rotating speed decomposition unit 11 further includes a plurality of left rotating shafts 13, and each right-rotating speed decomposition unit 12 further includes a plurality of right rotating shafts 14.

Figure 10:
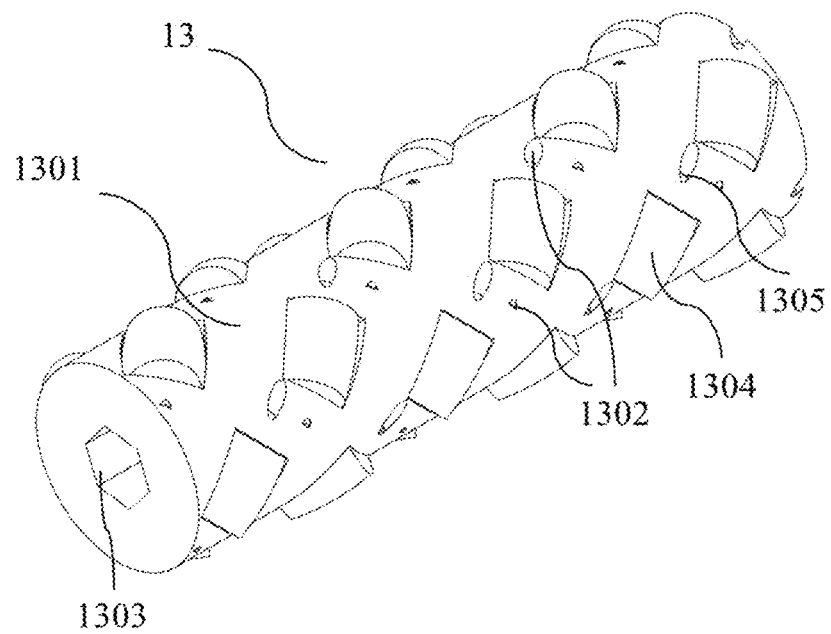
FIG. 10 is a schematic diagram of a left rotating shaft according to the present disclosure.
Figure 11:
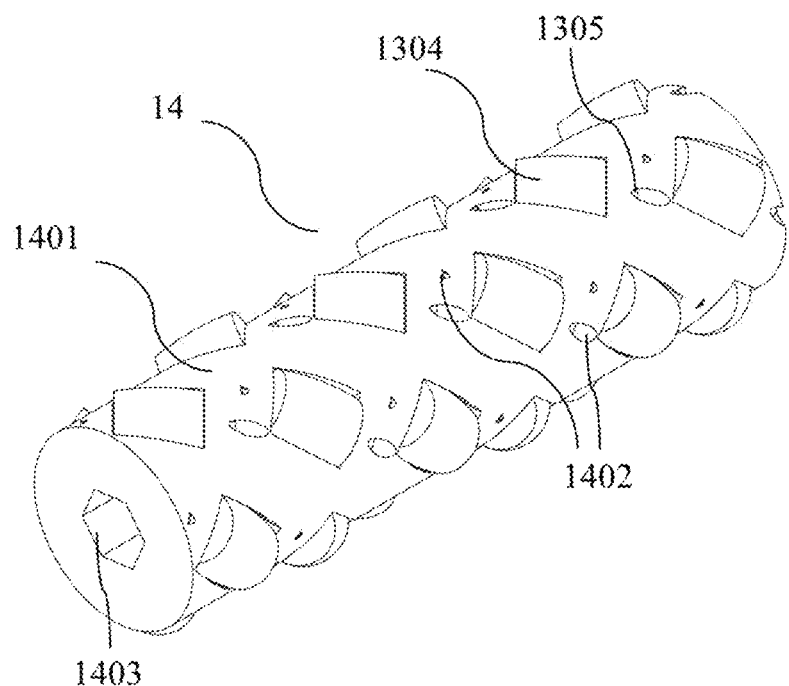
FIG. 11 is a schematic diagram of a right rotating shaft according to the present disclosure.

Specifically, one left rotating shaft 13 and one right rotating shaft 14 are shown in FIG. 10 and FIG. 11, and are respectively assembled with freely rotatable small wheels 1304 at positive 45 degrees or negative 45 degrees, and the small wheels 1304 are respectively supported by small axles 1305. The left rotating shaft 13 or the right rotating shaft 14 has a through hole 1303 or 1403 adapted to the load-bearing shaft 1101 in a central axis direction, and has small wheel mounting grooves and small axle mounting holes 1302 or 1402 with positive 45 degrees or negative 45 degrees on a shaft body 1301 or 1401 thereof. In this embodiment, a preferred solution is that the small axle mounting hole 1302 or 1402 is a unidirectional restriction structures, the small axles 1305 can only be inserted from a single direction. In addition, a two-way insertion structure, a snap-on structure, and an integrated structure are all achievable solutions. FIG. 10 and FIG. 11 illustrate the left rotating shaft 13 or the right rotating shaft 14 with six layers of small wheels, it should be noted that the left rotating shaft 13 or the right rotating shaft 14 has a plurality of different lengths, the number of layers of the small wheel layers thereon is accordingly different, and in the present invention, the left rotating shaft 13 or the right rotating shaft 14 with different layers, that is, two, three, four, five, six and seven, is used.

In the speed decomposition unit shown in FIG. 8 and FIG. 9, the load-bearing shaft 1101 is fixed on the shaft end supports 1102 and the shaft middle support 1103 by bearings and can rotate in an axial direction, and is further fixed on the chassis bottom plate 1001 by the shaft end supports 1102 and the shaft middle support 1103. In this embodiment, the load-bearing shaft 1101 is divided into a transmission area (such as Area D in FIG. 8) and a load-bearing area (such as Area E in FIG. 8). As shown in FIG. 7, the transmission area D is used for assembling the parallel transmission assemblies 15 to play a role of motion transmission, where the transmission area D of the load-bearing shaft 1101 of the adjacent left-rotating speed decomposition unit or the adjacent right-rotating speed decomposition unit has an overlapping part to facilitate the assembly of the parallel transmission assemblies 15. The load-bearing area E is assembled with a plurality of the left rotating shafts 13 or the right rotating shafts 14 through the through holes 1303 or 1403 to support and drive the left rotating shafts or the right rotating shafts to rotate, where a length of the load-bearing area is adjusted according to specific requirements and the type and number of the left rotating shaft 13 or the right rotating shaft 14 equipped therewith.

The load-bearing shaft 1101 and the through holes 1303, 1403 can be shaped to have any shape with a fixing function, such as a key slot and a key are used for fixing. In this embodiment, a regular hexagon is selected as a fixing solution, which has good symmetry, and can reduce vibration caused by rotation. In addition, similar regular polygons such as a regular quadrangle, a regular hexagon, a regular octagon, and the like, are also optional solutions.

In the load-bearing area of the load-load-bearing shaft 1101, adjacent left rotating shaft or right rotating shafts have a certain gap 1104 in an axial direction, and a reinforced bearing is mounted in the gap 1104.

Figure 12:
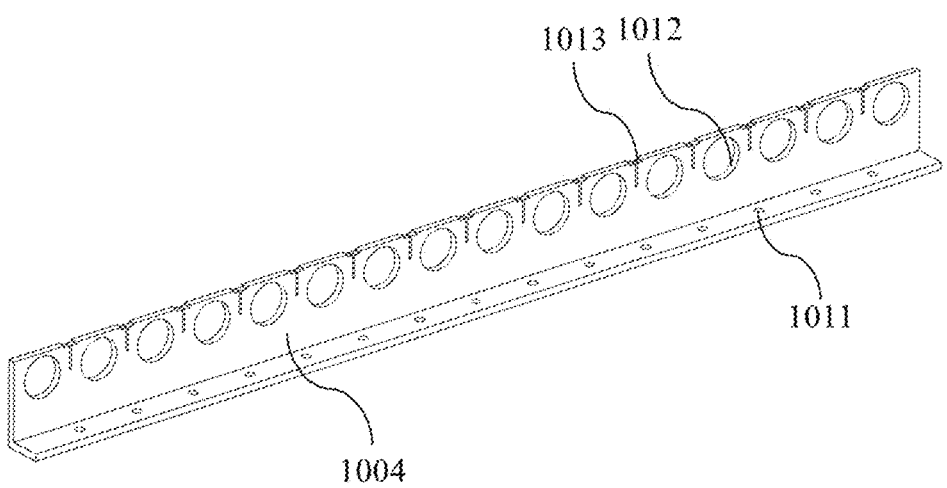
FIG. 12 is a schematic diagram of a middle reinforcement support plate according to the present disclosure.

FIG. 12 illustrates structural details of a middle reinforcement support plate 1004, including mounting holes 1011, reinforced bearing mounting holes 1012, and anti-pinch strip mounting grooves 1013, where one anti-pinch strip mounting groove 1013 is located in a middle of two reinforced bearing mounting holes 1012. According to different numbers of the reinforced bearing mounting holes 1012, the middle reinforcement support plate 1004 has a plurality of models, and the number of the reinforced bearing mounting holes 1012 on the middle reinforcement support plate 1004 used in this embodiment is 16, 22, or 26, respectively.

With reference to the details shown in FIG. 7, the plurality of middle reinforcement support plates 1004 are assembled and fixed on the chassis bottom plate 1001 through the mounting holes 1011. The reinforced bearing mounting holes 1012 are assembled and fixed with the reinforced bearing mounted inside the gap 1104, such that the middle reinforcement support plate 1004 provides additional support for the load-bearing area E of the load-bearing shaft 1101. The anti-pinch strip mounting grooves 1013 are configured to assemble and fix the anti-pinch strips 1005, so as to achieve effective separation between the adjacent left-handed speed decomposition unit and the right-handed decomposition unit, and prevent foreign objects from being involved in the machine when the platform is running. In this embodiment, the anti-pinch strips 1005 and the anti-pinch strip mounting grooves 1013 are T-shaped, which can effectively ensure that the anti-pinch strips and the anti-pinch strip mounting grooves are not prone to deformation when being subjected to external force.

Figure 13A:
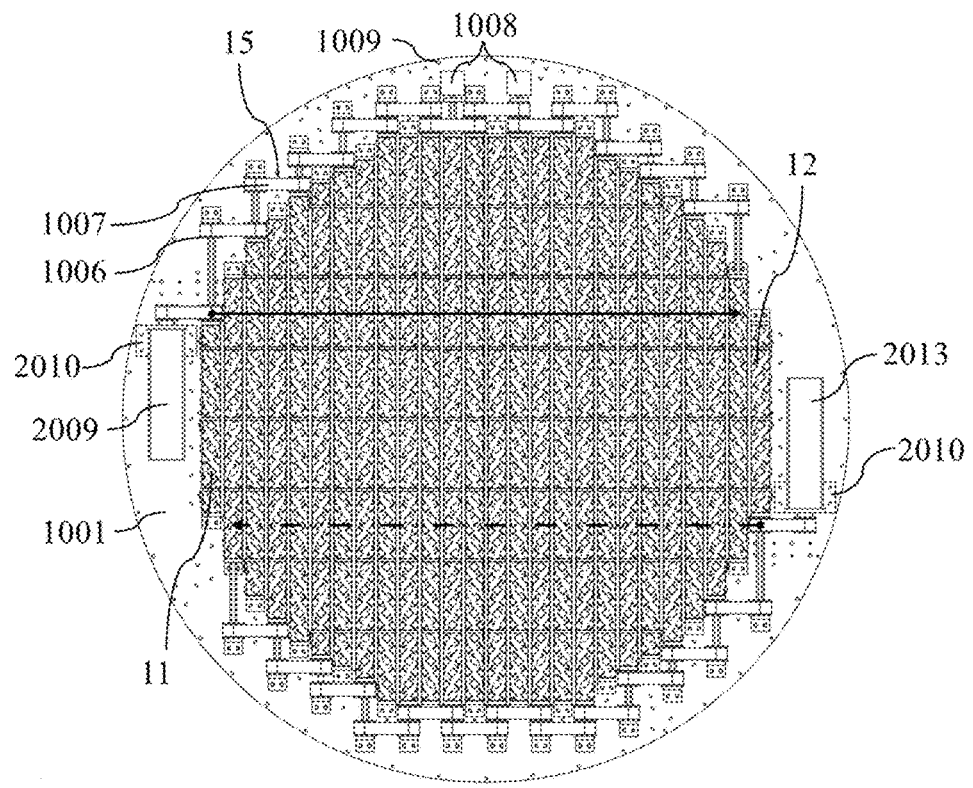
FIG. 13A is a schematic diagram that a left-rotating driving motor and a right-rotating driving motor are respectively located on opposite sides of an area where all the speed decomposition units are located.
Figure 13B:
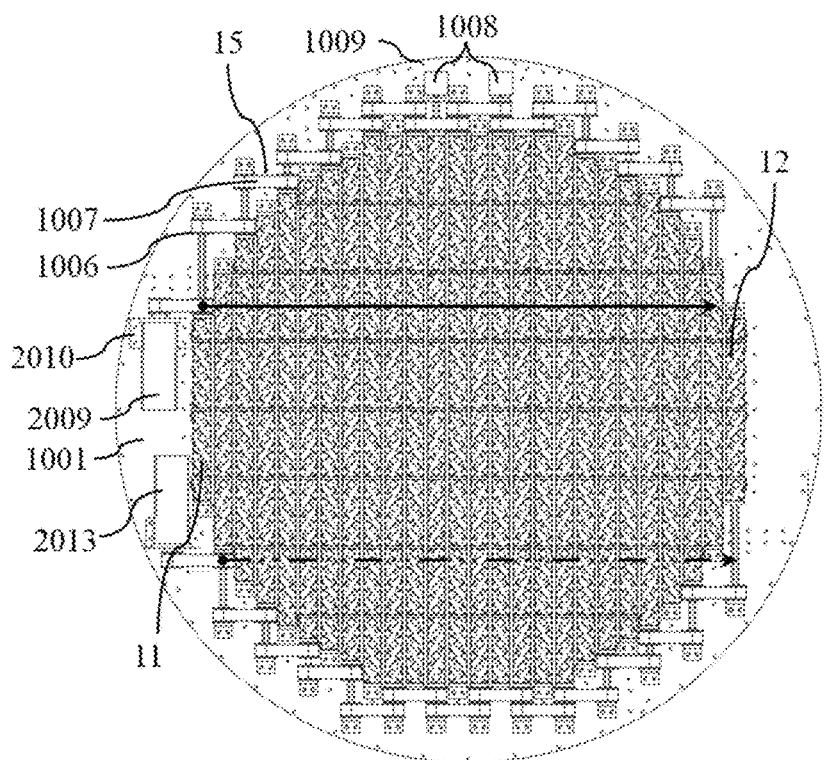
FIG. 13B is a schematic diagram that a left-rotating driving motor and a right-rotating driving motor are located on the same side of the area where all the speed decomposition units are located.
Figure 14:
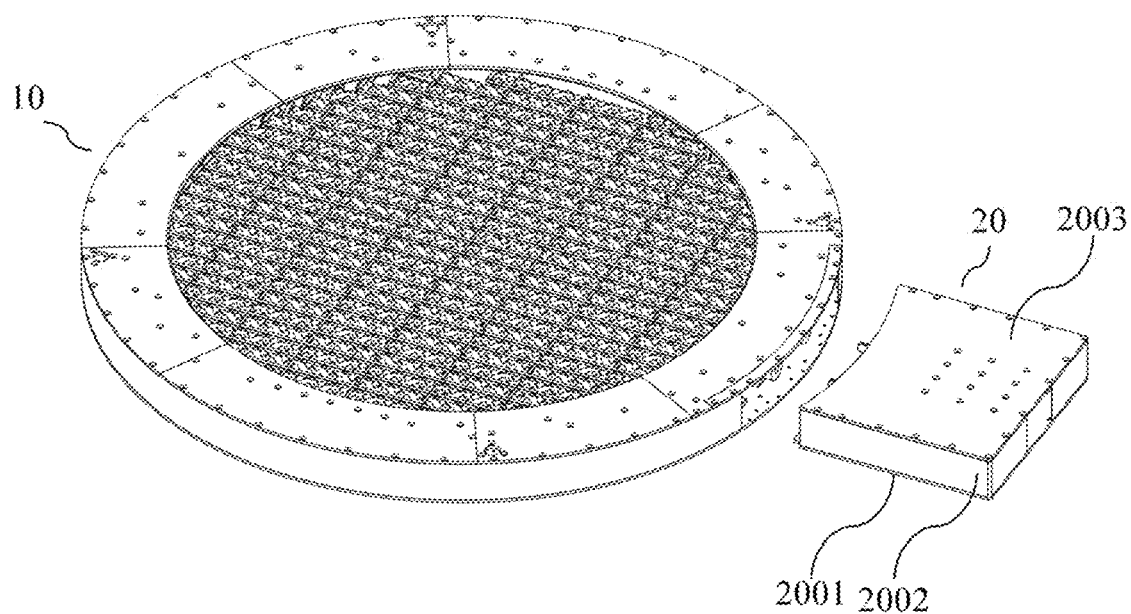
FIG. 14 is a schematic diagram of a driving unit before assembly according to the present invention.
Figure 15:
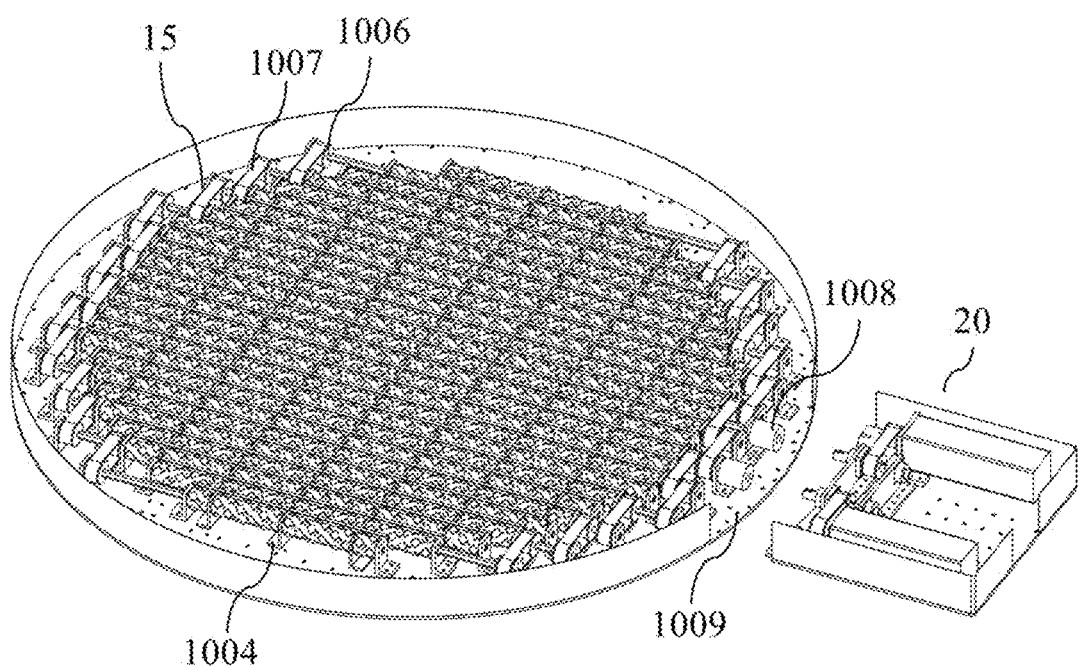
FIG. 15 is a schematic diagram of internal details of a driving unit before assembly, with a top cover removed, according to the present invention.
Figure 16:
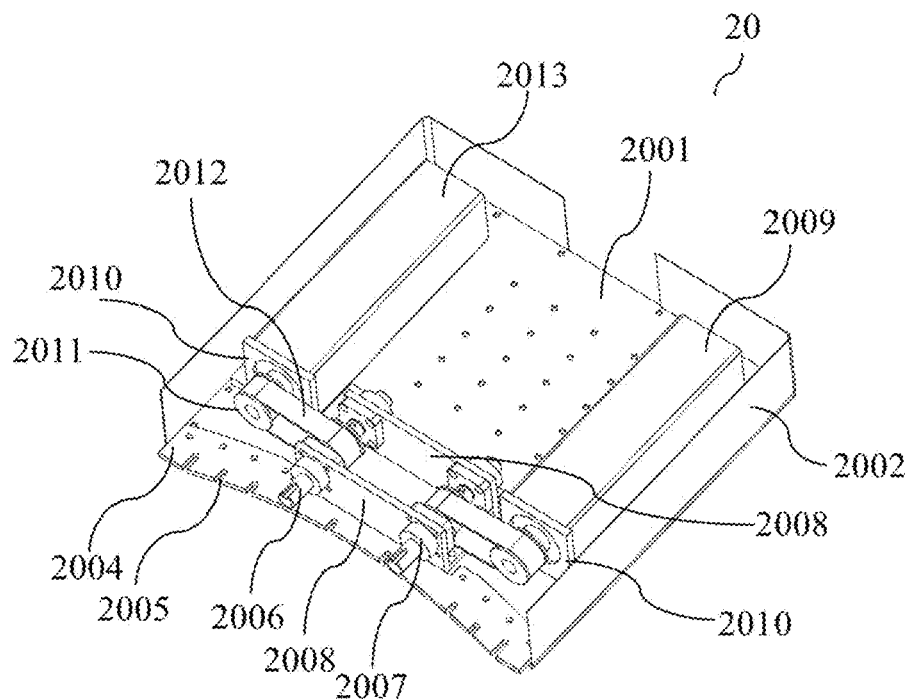
FIG. 16 is a schematic diagram of internal details of a driving unit according to the present invention.

FIG. 13A and FIG. 13B illustrates a Specific Embodiment 1 of the driving unit 20 in the present invention, where the standard driving unit interface is a motor bracket mounting hole formed on the chassis bottom plate 1001. The driving unit 20 includes a left-rotating driving motor 2009 and a right-rotating driving motor 2013, and the two motors are assembled on the chassis bottom plate 1001 through motor brackets 2010. The left-rotating drive motor 2009 is mounted beside an outermost left-rotating speed decomposition unit, and the outermost left-rotating speed decomposition unit serves as an active left-rotating speed decomposition unit. The right-rotating drive motor 2013 is mounted beside an outermost right-rotating speed decomposition unit, and the outermost right-rotating speed decomposition unit serves as an active right-rotating speed decomposition unit. As shown in FIG. 13A, the left-rotating driving motor 2009 and the right-rotating driving motor 2013 are respectively located on opposite sides of an area where all the speed decomposition units are located. As shown in FIG. 13B, the left-rotating driving motor 2009 and the right-rotating driving motor 2013 are located on the same side of the area where all the speed decomposition units are located. The two arrangement methods can both drive the rotation of the left-rotating speed decomposition units and the right-rotating speed decomposition units. The left-rotating driving motor 2009 sequentially drives the plurality of the left-rotating speed decomposition units 11 from one side through the parallel transmission assemblies 15. The right-rotating driving motor 2013 sequentially drives the plurality of the right-rotating speed decomposition units 12 from the other side through the parallel transmission assemblies 15, and a solid line with an arrow and a dashed line with an arrow in FIG. 13A and FIG. 13B show this transmission process. With the cooperation of the left-rotating driving motor 2009 and the right-rotating driving motor 2013, the left-rotating speed decomposition unit 11 and the right-rotating speed decomposition unit 12 can selectively rotate at the same speed in the same direction, or rotate at different speeds in the same direction, or rotate at different speeds in different directions.

FIG. 14 to FIG. 19 illustrate a Specific Embodiment 2 of the driving unit 20 in the present invention, where the standard driving unit interface is the driving unit connecting holes 1009 and the driving couplings 1008. The driving unit connecting holes 1009 are located on two sides of a central axis of the chassis bottom plate 1001. The driving couplings 1008 are respectively assembled at an end of one of the left-rotating speed decomposition units 11 and an end of one of the right-rotating speed decomposition units 12, where the left-rotating speed decomposition unit and the right-rotating speed decomposition unit respectively assembled with the driving couplings 1008 are close to both sides of a symmetrical central axis of the chassis bottom plate 1001.

The left-rotating speed decomposition unit 11 mounted with the driving coupling 1008 serves as the active left-rotating speed decomposition unit and rotates under the drive of the left-rotating driving motor 2009, and starts from a middle to both sides at the same time, so as to sequentially drive all the left-rotating speed decomposition units 11 to rotate. The right-rotating speed decomposition unit mounted with the driving coupling 1008 serves as the active right-rotating speed decomposition unit and rotates under the drive of the right-rotating driving motor 2013, and starts from a middle to both sides at the same time, so as to sequentially drive all the right-rotating speed decomposition units to rotate.

In this embodiment, the driving unit 20 is an independent module and includes a driving unit bottom plate 2001, a driving unit side edge 2002, a driving unit top cover 2003, a driving unit connecting plate 2004, a main driving shaft 2006, a main shaft height adaptation unit, the left-rotating driving motor 2009, and the right-rotating driving motor 2013, where a plurality of mounting holes are formed on the driving unit bottom plate 2001 for assembling and fixing the driving unit connecting plate 2004, the main shaft height adaptation unit and the motor brackets 2010.

The driving unit connecting plate 2004 has fixing grooves 2005 adapted to the driving unit connecting holes 1009 on the chassis bottom plate 1001. In this embodiment, a preferred shape of the fixing groove 2005 is U-shaped, which facilitates the insertion and removal of the driving unit 20 during installation, and in addition, round holes, self-locking buckles, magnetic attraction, and the like, are also feasible solutions.

The main shaft height adaptation unit includes a main driving shaft bearing 2007 and a main driving shaft supporting plate 2008, and the main driving shaft 2006 passes through the main driving shaft bearing 2007 and is fixed to a preset height same as that of the driving couplings 1008 by the main driving shaft supporting plate 2008. The left-rotating driving motor 2009 and the right-rotating driving motor 2013 are fixed on the driving unit bottom plate 2001 through the motor brackets 2010, and are connected to the corresponding main driving shaft 2006 through a set of parallel transmission assemblies 15.

Figure 17:
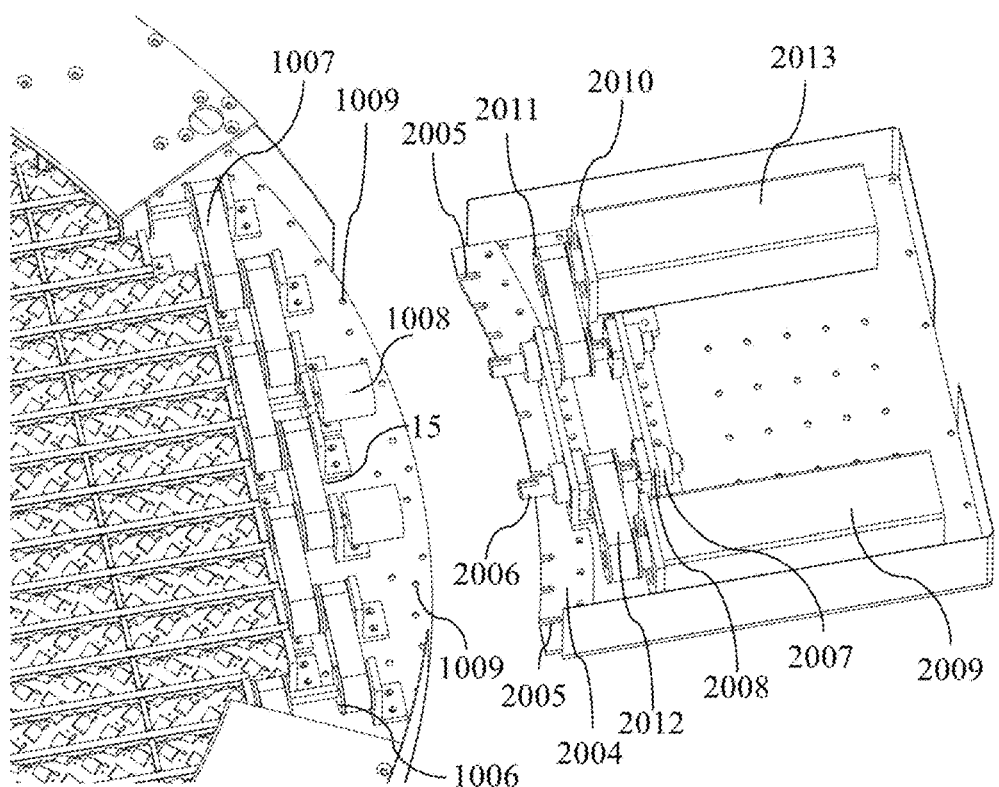
FIG. 17 is a schematic diagram of the local details of a driving unit when being assembled according to the present invention.
Figure 18:
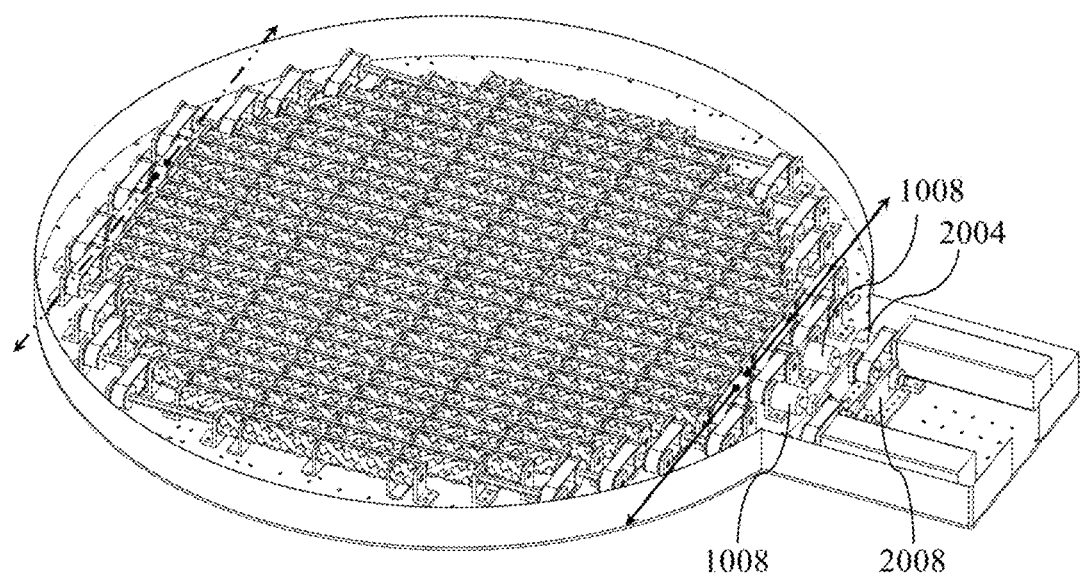
FIG. 18 is a schematic diagram of internal details of a driving unit after assembly, with a top cover removed, according to the present invention.

As shown in FIG. 17 and FIG. 18, when the driving unit 20 is assembled, the main driving shaft 2006 is assembled and fixed with the driving couplings 1008, and the fixing grooves 2005 on the driving unit connecting plate 2004 are assembled and fixed to the driving unit connecting holes 1009 on the chassis bottom plate 1001.

In the transmission process of the driving unit 20, the left-rotating driving motor 2009 and the right-rotating driving motor 2013 first drive the highly adapted main driving shaft 2006 through synchronous wheels 2011 and synchronous belts 2012, and further transmit driving force to the left-rotating speed decomposition unit 11 and the right-rotating speed decomposition unit 12 located in a middle of the chassis bottom plate 1001 by the driving couplings 1008, and sequentially drive the plurality of the left-rotating speed decomposition units 11 and the right-rotating speed decomposition units 12 assembled in sequence from the middle to both sides, and a solid line with an arrow and a dashed line with an arrow in FIG. 18 show this transmission process.

Figure 19:
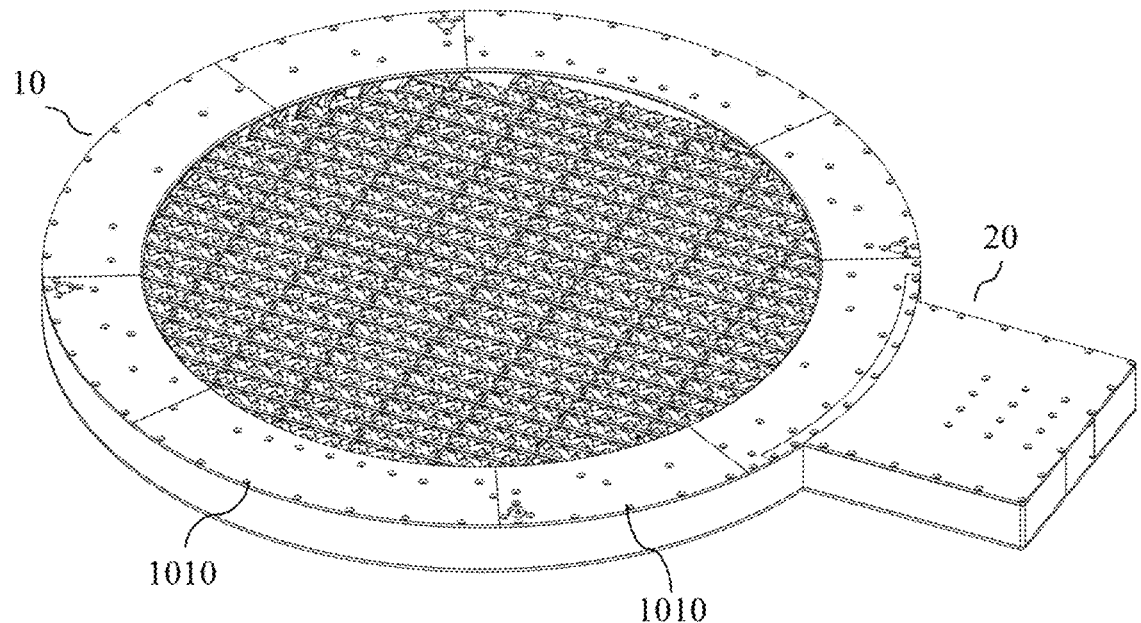
FIG. 19 is a schematic diagram of a driving unit after assembly, without being assembled with a device expansion turntable, according to the present invention.

FIG. 19 illustrates effect after the assembly of the driving unit 20 is completed.

In this embodiment, the left-rotating driving motor 2009 and the right-rotating driving motor 2013 can be adjusted according to actual situation, under the condition that the main shaft height adaptation units of driving motors with different sizes and models are highly adapted, rotation output from the driving motors can be unified at the same preset height in spite of different heights of motor shafts, and the driving type omnidirectional motion chassis 10 is thus driven to operate, such that modularization of driving functions are realized, and maintainability and scalability are improved.

Figure 20:
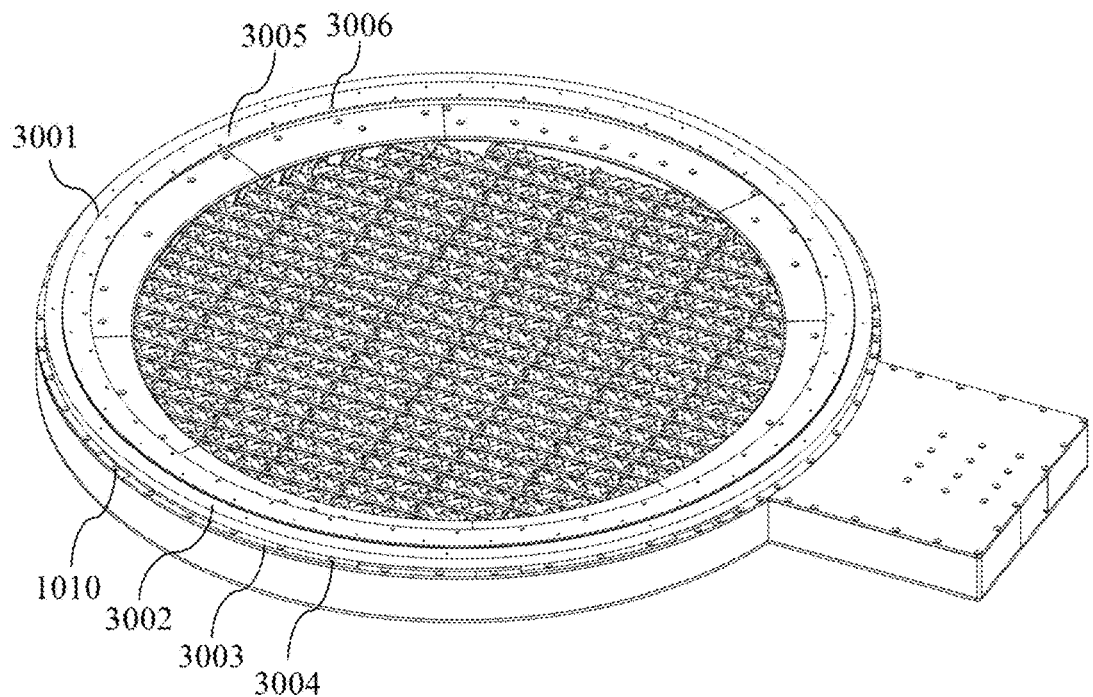
FIG. 20 is a schematic diagram of a driving type omnidirectional motion chassis after being assembled with a device expansion turntable according to the present invention.
Figure 21:
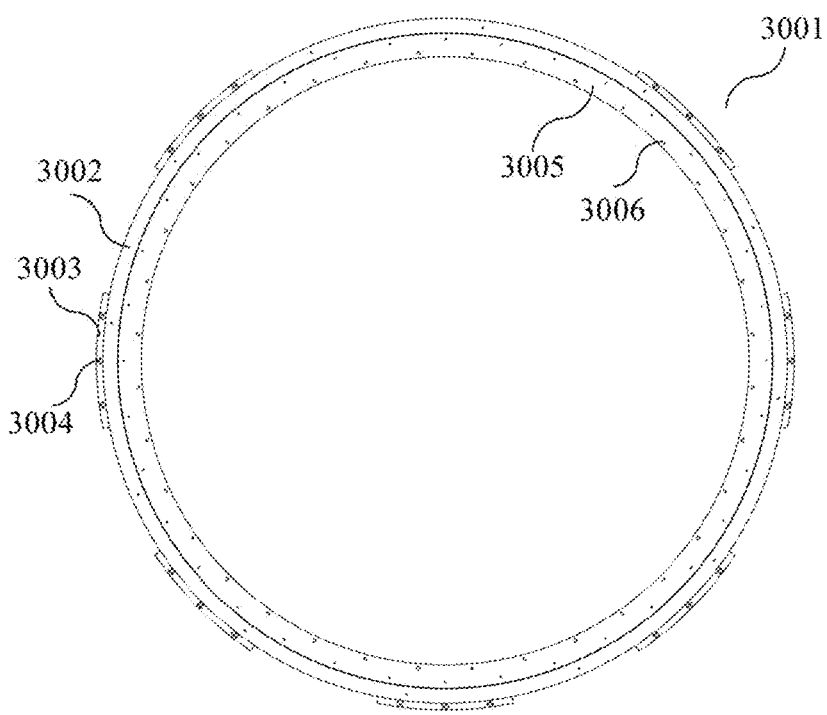
FIG. 21 is a top view of a device expansion turntable according to the present invention.
Figure 22:
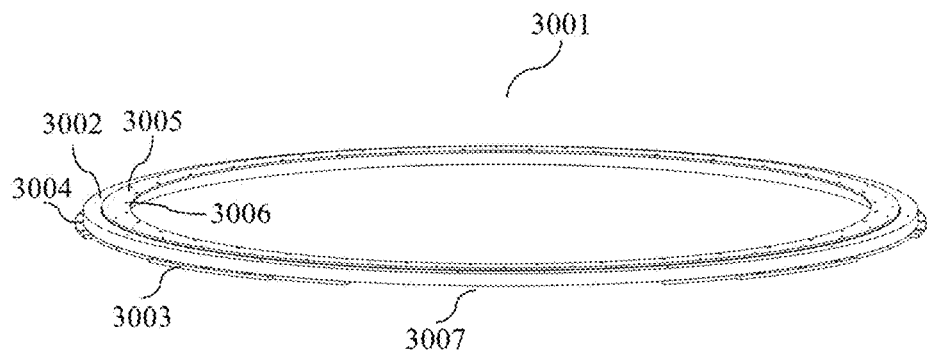
FIG. 22 is a schematic diagram of a device expansion turntable from another angle of view according to the present invention.

FIG. 20 to FIG. 22 illustrate one specific embodiment of key components for device expansion, mainly including the device expansion turntable 3001, and an assembly method of the device expansion turntable on the top chassis cover 1003. As shown in FIG. 21, the device expansion turntable 3001 has an outer ring 3002 and an inner ring 3005, and the inner ring 3005 and the outer ring 3002 can rotate relative to each other. As shown in FIG. 22, the outer ring 3002 and the inner ring 3005 have a height difference, where a bottom portion of the outer ring is lower than a bottom portion of the inner ring, and a top portion of the inner ring is higher than a top portion of the outer ring. A groove 3007 with a certain length is formed at the bottom portion of the outer ring for facilitating the mounting of a wired expansion device in a middle of the device expansion turntable 3001. It should be noted that a plurality of grooves with a certain interval can be arranged according to actual situation. In addition, device expansion turntable fixing holes 3004 adapted to the top chassis cover 1003 are formed at intervals on an outer side 3003 of the outer ring, and the outer ring 3002 is fixed on a top portion of the top chassis cover 1003. A plurality of device expansion fixing holes 3006 are formed at intervals on an inner side of the inner ring 3005 for connecting and mounting the expansion device needing to be moved.

Figure 23:
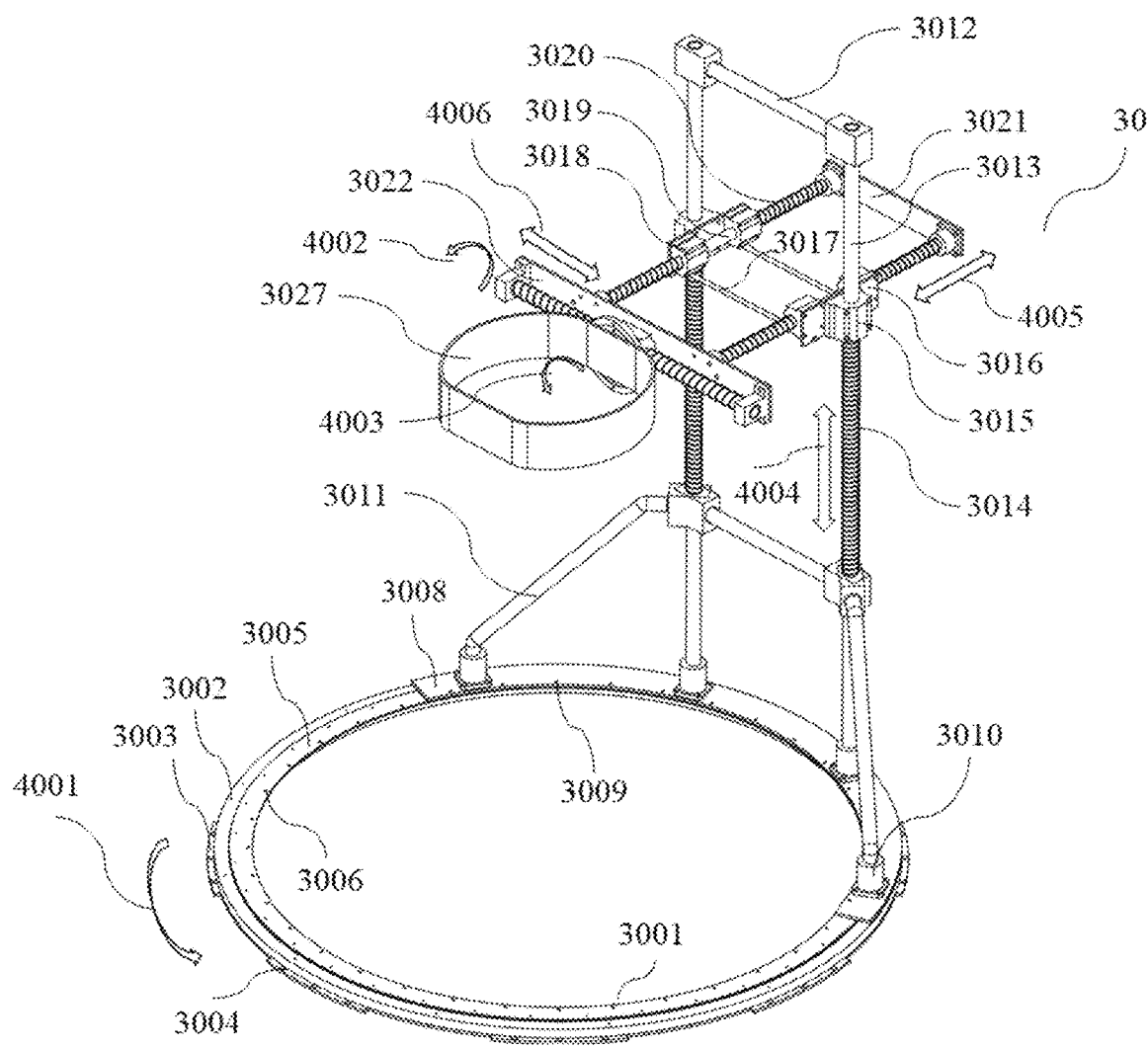
FIG. 23 is a complete schematic diagram of a protection support according to the present invention.
Figure 24:
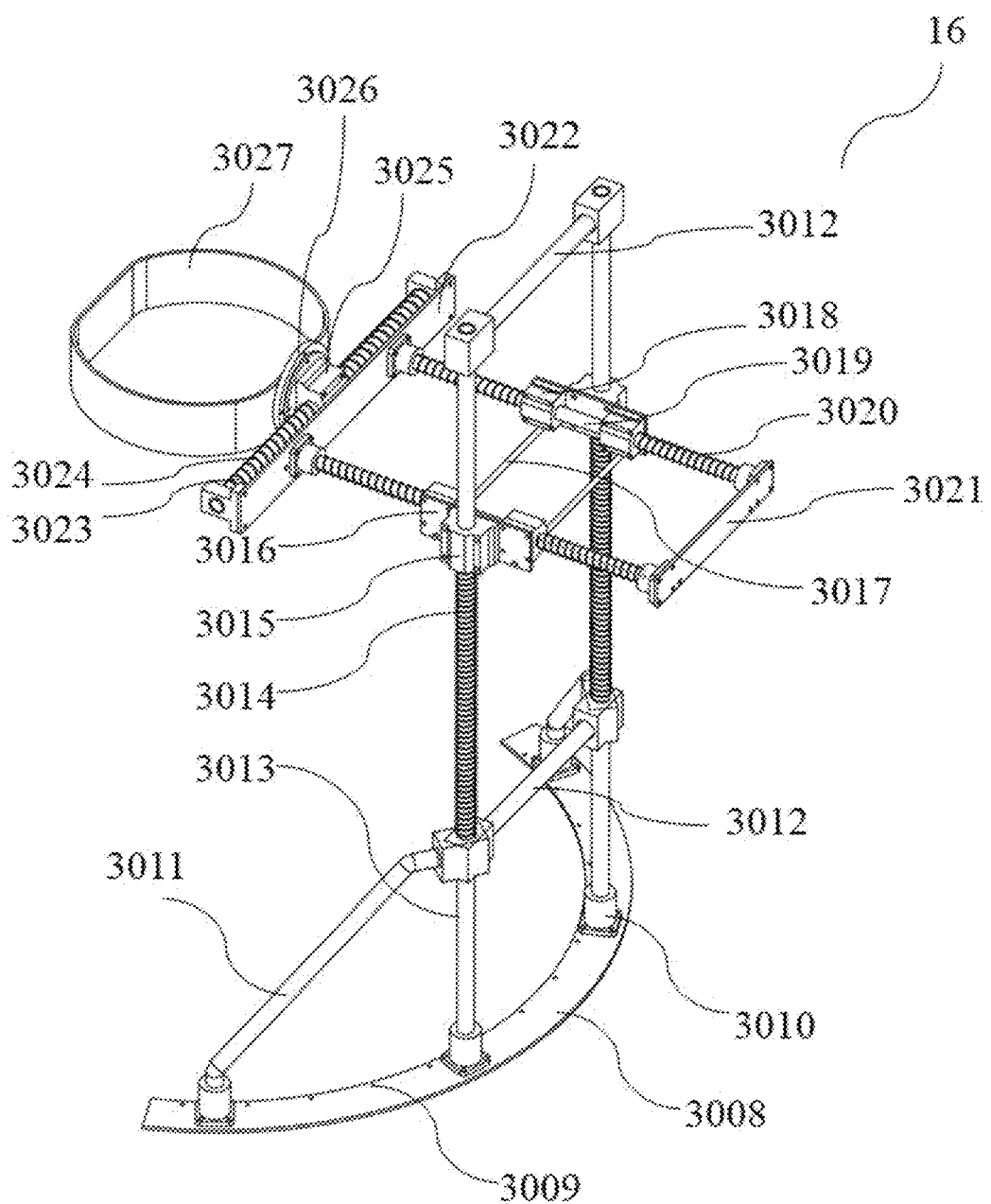
FIG. 24 is a schematic diagram of details of a back-type lumbar support, one of the components of the protection support, according to the present invention.
Figure 25:
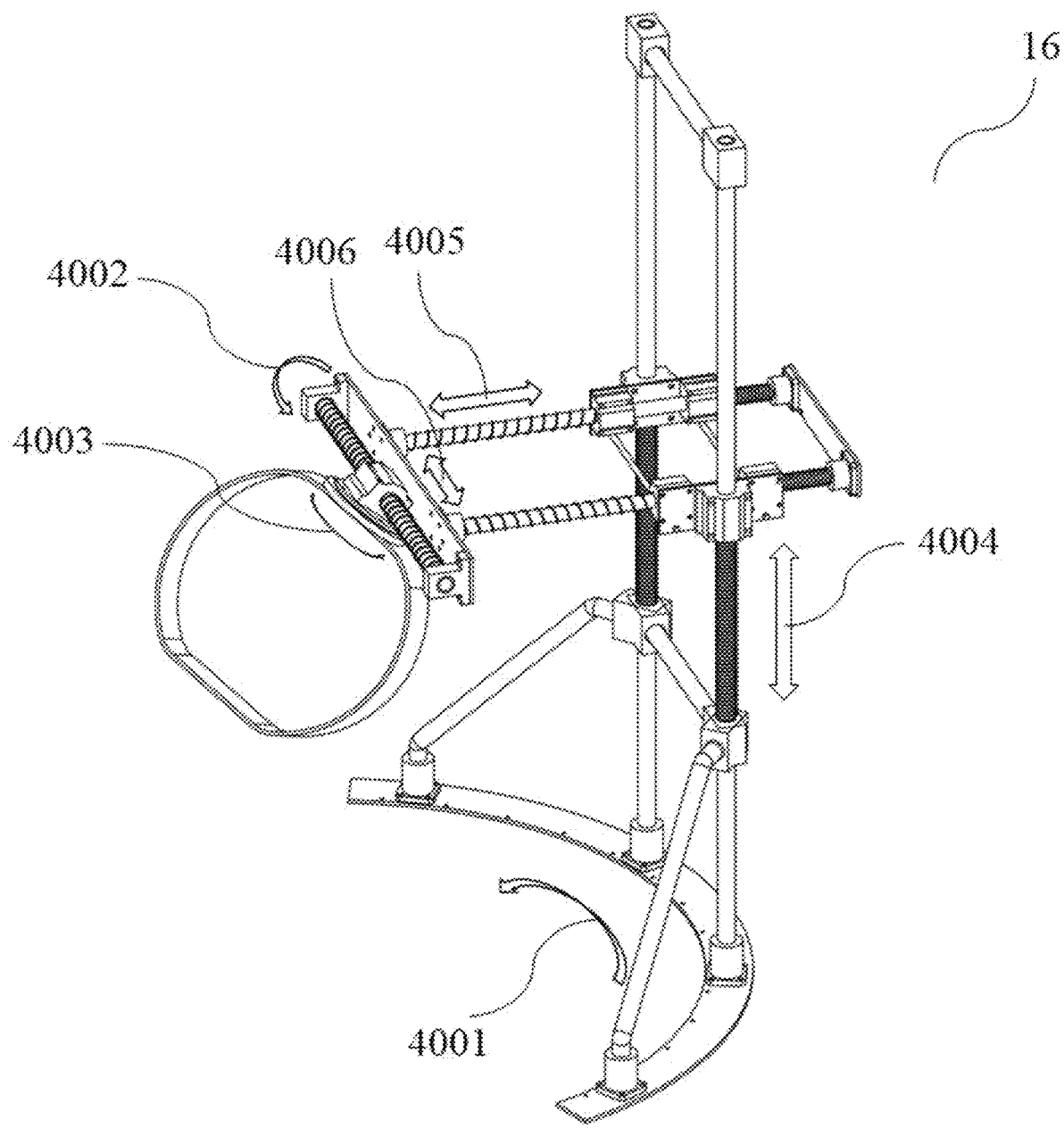
FIG. 25 is a schematic diagram of a six-degree-of-freedom demonstration of a protection support according to the present invention.

FIG. 23 to FIG. 25 illustrate a Specific Embodiment 1 of the protection support 30 in the present invention.

A standard protection support interface is device expansion fixing holes 3006 formed on the inner ring 3005 of the device expansion turntable. The protection support 30 is composed of the device expansion turntable 3001 and a back-type lumbar support 16 as shown in FIG. 24. The back-type lumbar support 16 is fixed to the device expansion turntable 3001 through a lumbar support bottom plate 3008.

Vertical linear rails 3013 are assembled on the lumbar support bottom plate 3008 through flanges 3010, and are reinforced by primary oblique reinforcing members 3011 and primary transverse reinforcing members 3012. One vertical sliding block 3015 is assembled on each of the vertical linear rails 3013, and a first-level spring 3014 is assembled below the vertical sliding block 3015, such that the vertical sliding block 3015 provides a vertical movement and counteracts its gravity through the first-level spring 3014.

A longitudinal sliding-block fixing plate 3016 is assembled the vertical sliding block 3015, a longitudinal sliding block 3018 is assembled and fixed on the longitudinal sliding-block fixing plate 3016, and the opposite longitudinal sliding-block fixing plates 3016 are reinforced by a secondary transverse reinforcing member 3017.

A longitudinal linear rail 3019 passes through the longitudinal sliding block 3018, and the longitudinal linear rail 3019 is connected by a transverse reinforcing plate 3021 at an end of a side away from a center of the chassis bottom plate 1001. The longitudinal linear rail is assembled with a transverse linear-rail fixing plate 3022 at an end of a side facing the center of the chassis bottom plate 1001. One second-level spring 3020 is respectively assembled between the longitudinal sliding block 3018 and the transverse reinforcing plate 3021, and between the longitudinal sliding block 3018 and the transverse linear-rail fixing plate 3022.

A transverse linear rail 3023 is assembled and fixed on the transverse linear-rail fixing plate 3022, and a transverse sliding block 3025 is assembled on the transverse linear rail 3023. Three-level springs 3024 are respectively assembled on the transverse linear rails 3023 on both sides of the transverse sliding block 3025. The transverse sliding block 3025 can slide in a direction of the transverse linear rail 3023 and rotate in an axis direction of the transverse linear rail. In this embodiment, one solution in which the transverse sliding block 3025 rotates in the axis direction of the transverse linear rail 3023 is to use a circular shaft as the transverse linear rail 3023, and arrangement of bearings on both sides of the transverse linear rail 3023 is also a feasible solution.

In this embodiment, the transverse sliding block 3025 is assembled and fixed with an inner ring of a belt turntable 3026, and an outer ring of the belt turntable 3026 is assembled and connected to a belt module 3027. The inner ring and the outer ring of the belt turntable 3026 can rotate relative to each other.

The protection support 30 provided in this embodiment enables a user to achieve motion in a vertical direction 4004, a longitudinal direction 4005, and a transverse direction 4006, and rotation in a heading direction 4001, a pitching direction 4002, and a rolling direction 4003, such that complete decoupling of six degrees of freedom of human motion is achieved. The motion of the vertical sliding block 3015 on the vertical linear rail 3013 provides a displacement degree of freedom in the vertical direction 4004, the motion of the longitudinal sliding block 3018 on the longitudinal linear rail 3019 provides a displacement degree of freedom in the longitudinal direction 4005, the motion of the transverse sliding block 3025 on the transverse linear rail 3023 provides a displacement degree of freedom in the transverse direction 4006, the rotation of the device expansion turntable 3001 provides a rotation degree of freedom in the heading direction 4001, the rotation of the transverse sliding block 3025 on the axis direction of the transverse linear rail 3023 provides a rotation degree of freedom in the pitching direction 4002, and the rotation of the belt turntable 3026 provides a rotation degree of freedom in the rolling direction 4003. By completely decoupling each degree of freedom, different protection measures can be taken for different degrees of freedom, for example, the first-level spring 3014, the second-level spring 3020 and the third-level spring 3024 are respectively disposed in the directions of three displacement degrees of freedom. Since ranges of acceleration of a human body in the longitudinal and transverse directions are different, and the user will experience transverse swings at intervals during normal walking, the second-level spring 3020 and the third-level spring 3024 use springs with different elastic coefficients, such that enough safety protection is provided while the degree of freedom of the user is not affected, thereby achieving an effective balance between comfort and safety. In addition, it should be noted that the springs at various levels herein can also be replaced by tension springs, or by setting other structures with force feedback.

Figure 26:
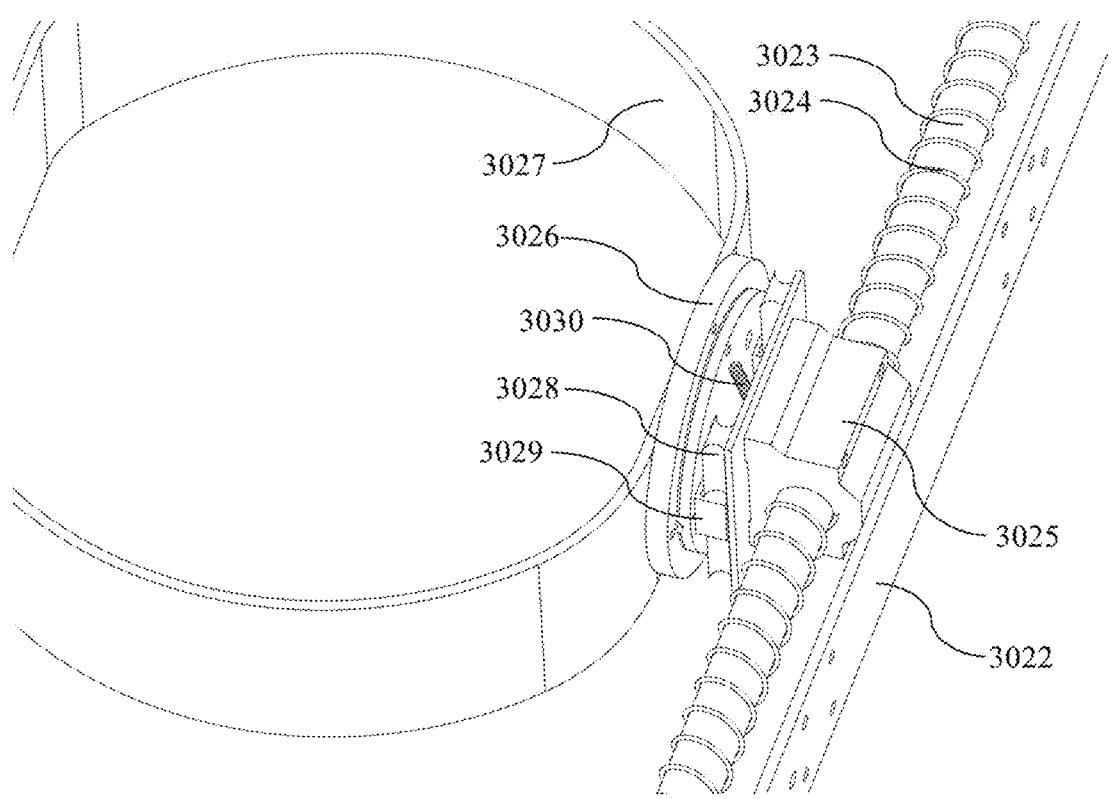
FIG. 26 is a schematic diagram of a vertical buffer according to the present invention.

FIG. 26 illustrates a Specific Embodiment 2 of the protection support 30 in the present invention. Compared with the Specific Embodiment 1, a vertical buffer is introduced, the vertical buffer includes a vertical buffer rail 3028, a vertical buffer sliding block 3029, and a buffer spring 3030. The transverse sliding block 3025 is first fixedly assembled with the vertical buffer rail 3028, the vertical buffer sliding block 3029 slides on the vertical buffer rail 3028, the vertical buffer sliding block 3029 is further connected and fixed to the inner ring of the belt turntable 3026, and the belt turntable 3026 is connected and fixed to the belt module 3027. The inner ring and the outer ring of the belt turntable can rotate relative to each other. Through the vertical buffer, fluctuations of the user in the vertical direction are buffered and filtered, thereby reducing periodic fluctuations of the structure carried by the vertical sliding block 3015 in the vertical direction when the user moves.

The above embodiments are merely preferred implementations of the present invention, and it should be noted that those ordinarily skilled in the art can several improvements and equivalent substitutions without departing from the principles of the present invention, and these technical solutions after improvements and equivalent substitutions of the claims of the present invention all fall within the protection scope of the present invention.

What is claimed is:

1. A modular omnidirectional motion platform, comprising a driving type omnidirectional motion chassis, and a driving unit and a protection support mounted on the driving type omnidirectional motion chassis, wherein the driving type omnidirectional motion chassis comprises a chassis bottom plate, and a plurality of longitudinal elongated speed decomposition units are mounted on the chassis bottom plate; and the speed decomposition units comprise left-rotating speed decomposition units and right-rotating speed decomposition units;

a rotational speed of each of the left-rotating speed decomposition units is the same; a rotational speed of each of the right-rotating speed decomposition units is the same; all the left-rotating speed decomposition units and the right-rotating speed decomposition units are alternately arranged in a parallel manner; the left-rotating speed decomposition units have different lengths; and the right-rotating speed decomposition units have different lengths; and each of the speed decomposition units comprises a load-bearing shaft and rotating shafts fixed around the load-bearing shaft; parallel transmission assemblies are disposed on the load-bearing shafts of the speed decomposition units, adjacent two of the left-rotating speed decomposition units are connected by one parallel transmission assembly, and adjacent two of the right-rotating speed decomposition units are connected by one parallel transmission assembly; at least one of the left-rotating speed decomposition units serves as an active left-rotating speed decomposition unit, and the active left-rotating speed decomposition unit rotates and transmits through the parallel transmission assemblies, such that all the left-rotating speed decomposition units rotate together at a same speed in a same direction; and at least one of the right-rotating speed decomposition units serves as an active right-rotating speed decomposition unit, and the active right-rotating speed decomposition unit rotates and transmits through the parallel transmission assemblies, such that all the right-rotating speed decomposition units rotate together at a same speed in a same direction.

2. The modular omnidirectional motion platform according to claim 1, wherein each of the speed decomposition units further comprises shaft end supports and a shaft middle support; and a plurality of small wheels with axles thereof arranged along a spiral line are disposed on each of the rotating shafts, a rotational direction of spiral lines disposed on the rotating shafts of the left-rotating speed decomposition units is opposite to a rotational direction of spiral lines disposed on the rotating shafts of the right-rotating speed decomposition units.

3. The modular omnidirectional motion platform according to claim 2, wherein the rotating shafts of the left-rotating speed decomposition units are assembled with freely rotatable small wheels arranged in positive 45 degrees; the rotating shafts of the right-rotating speed decomposition units are assembled with freely rotatable small wheels arranged in negative 45 degrees; and the small wheels are respectively supported by small axles;
  each rotating shaft has a through hole matching the load-bearing shaft in a central axis direction, and has small wheel mounting grooves and small axle mounting holes arranged in positive 45 degrees or negative 45 degrees on a shaft body thereof; and each small axle mounting hole is an unidirectional restriction structure and the axle is able to only be inserted from a single direction;
  the load-bearing shaft is fixed on the shaft end supports and the shaft middle support by bearings, and is further fixed on the chassis bottom plate by the shaft end supports and the shaft middle support; and
  the load-bearing shaft is divided into a transmission area and a load-bearing area; the transmission area is assembled with the parallel transmission assembly; and the load-bearing area is assembled with the rotating shafts via the through holes.

4. The modular omnidirectional motion platform according to claim 3, wherein among all the speed decomposition units, the speed decomposition unit located at an outermost side has a minimum length, and a length of the speed decomposition unit is set to be gradually increased from outside to inside; and the driving type omnidirectional motion chassis is a circular chassis or a regular octagonal chassis.

5. The modular omnidirectional motion platform according to claim 1, wherein each of the speed decomposition units is divided into a front end and a rear end in a longitudinal elongated direction; the parallel transmission assemblies disposed on the left-handed speed decomposition units are all located at the front end; the parallel transmission assemblies disposed on the right-rotating speed decomposition units are all located at the rear end.

6. The modular omnidirectional motion platform according to claim 1, wherein
  the driving unit comprises a left-rotating driving motor and a right-rotating driving motor; the left-rotating drive motor is mounted beside an outermost left-rotating speed decomposition unit, and the outermost left-rotating speed decomposition unit serves as the active left-rotating speed decomposition unit; and the right-rotating drive motor is mounted beside an outermost right-rotating speed decomposition unit, and the outermost right-rotating speed decomposition unit serves as the active right-rotating speed decomposition unit; and
  the left-rotating driving motor sequentially drives all the left-rotating speed decomposition units from one side through the parallel transmission assemblies; and the right-rotating driving motor sequentially drives all the right-rotating speed decomposition units from a side through the parallel transmission assemblies.

7. The modular omnidirectional motion platform according to claim 1, wherein
  the driving unit comprises a left-rotating driving motor and a right-rotating driving motor, and two driving couplings;
  the two driving couplings are respectively assembled at an end of one of the left-rotating speed decomposition units and an end of one of the right-rotating speed decomposition units, wherein the left-rotating speed decomposition unit and the right-rotating speed decomposition unit respectively assembled with the driving couplings are adjacent to both sides of a symmetrical central axis of the chassis bottom plate; and
  the left-rotating speed decomposition unit mounted with the driving coupling serves as the active left-rotating speed decomposition unit and rotates under the drive of the left-rotating driving motor, and starts from a middle to both sides at the same time, so as to sequentially drive all the left-rotating speed decomposition units to rotate; and the right-rotating speed decomposition unit mounted with the driving coupling serves as the active right-rotating speed decomposition unit and rotates under the drive of the right-rotating driving motor, and starts from a middle to both sides at the same time, so as to sequentially drive all the right-rotating speed decomposition units to rotate.

8. The modular omnidirectional motion platform according to claim 1, wherein the driving type omnidirectional motion chassis further comprises a plurality of middle reinforcement support plates and a plurality of anti-pinch strips; and each of the middle reinforcement support plates has a plurality of anti-pinch strip mounting grooves for being respectively assembled and fixed with the anti-pinch strips.

9. The modular omnidirectional motion platform according to claim 1, wherein
  a top cover surface edge of the driving type omnidirectional motion chassis is assembled with a device expansion turntable, the device expansion turntable has an outer ring and an inner ring, and the inner ring and the outer ring is rotatable relative to each other;
  the outer ring and the inner ring have a height difference, wherein a bottom portion of the outer ring is lower than a bottom portion of the inner ring, and a top portion of the inner ring is higher than a top portion of the outer ring;
  a groove with a length is formed at the bottom portion of the outer ring;
  a plurality of device expansion turntable fixing holes adapted to a top cover of the driving type omnidirectional motion chassis are formed at intervals on an outer side of the outer ring, and the outer ring is fixed to the top cover of the driving type omnidirectional motion chassis through the device expansion turntable fixing holes; and
  a plurality of device expansion fixing holes are formed at intervals on an inner side of the inner ring.

10. The modular omnidirectional motion platform according to claim 9, wherein
  the protection support comprises a back-type lumbar support;
  the back-type lumbar support is fixed to the device expansion turntable through a lumbar support bottom plate;
  a plurality of vertical linear rails are assembled on the lumbar support bottom plate, and are reinforced by primary oblique reinforcing members and primary transverse reinforcing members; and one vertical sliding block is assembled on each of the vertical linear rails, and a first-level spring is assembled below the vertical sliding block;

a vertical sliding block is assembled with a longitudinal sliding-block fixing plate, the longitudinal sliding-block fixing plate is assembled with a longitudinal sliding block, and the opposite longitudinal sliding-block fixing plates of the vertical linear rails are reinforced by a secondary transverse reinforcing member;

a longitudinal linear rail passes through the longitudinal sliding block, and the longitudinal linear rail is connected to a transverse reinforcing plate at an end of a side of the longitudinal linear rail away from a center of the chassis bottom plate; the longitudinal linear rail is assembled with a transverse linear-rail fixing plate at an end of a side facing the center of the chassis bottom plate; and one second-level spring is respectively assembled between the longitudinal sliding block and the transverse reinforcing plate, and between the longitudinal sliding block and the transverse linear-rail fixing plate;

a transverse linear rail is assembled and fixed on the transverse linear-rail fixing plate; and a transverse sliding block is assembled on the transverse linear rail;

the transverse sliding block is slidable in a direction of the transverse linear rail and rotatable in an axis direction of the transverse linear rail;

three-level springs are respectively assembled on the transverse linear rails on both sides of the transverse sliding block; and the lumbar support comprises a belt turntable and a belt module fixed on a transverse sliding block, the belt turntable comprises an inner ring and an outer ring; and the transverse sliding block is assembled and fixed with the inner ring of the belt turntable, and the outer ring of the belt turntable is assembled and connected to the belt module; and the inner ring and the outer ring of the belt turntable is rotatable relative to each other.

11. The modular omnidirectional motion platform according to claim 10, wherein the transverse sliding block is assembled and connected to the belt turntable through a vertical buffer; the vertical buffer comprises a vertical buffer rail, a vertical buffer sliding block, and a buffer spring; and the vertical buffer rail is fixed on the transverse sliding block, the vertical buffer sliding block is slidable on the vertical buffer rail, and the vertical buffer sliding block is connected and fixed to the belt turntable.

12. The modular omnidirectional motion platform according to claim 10, wherein the driving type omnidirectional motion chassis is provided with a standard driving unit interface and a standard protection support interface, the driving unit is assembled through the standard driving unit interface, and the protection support is assembled through the standard protection support interface.

* * * * *